(12) United States Patent
Nogami et al.

(10) Patent No.: US 9,882,662 B2
(45) Date of Patent: Jan. 30, 2018

(54) SYSTEMS AND METHODS FOR LICENSE ASSISTED ACCESS

(71) Applicant: Sharp Laboratories of America, Inc., Camas, WA (US)

(72) Inventors: Toshizo Nogami, Vancouver, WA (US); Zhanping Yin, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 191 days.

(21) Appl. No.: 14/936,644

(22) Filed: Nov. 9, 2015

(65) Prior Publication Data
US 2016/0135181 A1 May 12, 2016

Related U.S. Application Data

(60) Provisional application No. 62/078,324, filed on Nov. 11, 2014.

(51) Int. Cl.
| | |
|---|---|
| *H04W 4/00* | (2009.01) |
| *H04B 17/318* | (2015.01) |
| *H04W 24/08* | (2009.01) |
| *H04L 5/00* | (2006.01) |
| *H04W 72/00* | (2009.01) |
| *H04W 72/04* | (2009.01) |

(52) U.S. Cl.
CPC ......... *H04B 17/318* (2015.01); *H04L 5/0053* (2013.01); *H04W 24/08* (2013.01); *H04W 72/005* (2013.01); *H04L 5/0007* (2013.01); *H04W 72/042* (2013.01)

(58) Field of Classification Search
CPC .................. H04L 5/0053; H04W 72/0406
See application file for complete search history.

(56) References Cited

U.S. PATENT DOCUMENTS

| | | | |
|---|---|---|---|
| 2010/0135159 A1* | 6/2010 | Chun | H04W 72/1289 370/241 |
| 2011/0200137 A1* | 8/2011 | Han | H04L 5/0048 375/295 |
| 2012/0106478 A1* | 5/2012 | Han | H04L 5/0053 370/329 |

(Continued)

OTHER PUBLICATIONS

Ericsson, "Initial discussion on solutions for identified LAA functionalities", 3GPP TSG RAN WG1 Meeting #78bis, R1-144267, Oct. 2014.

(Continued)

*Primary Examiner* — Kevin C Harper
(74) *Attorney, Agent, or Firm* — Austin Rapp

(57) ABSTRACT

A user equipment (UE) is described. The UE includes a higher layer processor configured to receive a radio resource control (RRC) message to specify subframes for a channel state information-reference signal (CSI-RS). The UE also includes a control channel receiver configured to monitor a first control channel and a second control channel in a subframe. The first control channel indicates whether the CSI-RS in the subframe is available for CSI measurement. The second control channel is a control channel of which detection indicates a transmission of a shared channel in the subframe. The UE further includes a shared channel receiver configured to receive the shared channel when the second control channel is detected.

8 Claims, 25 Drawing Sheets

(56) References Cited

U.S. PATENT DOCUMENTS

| | | | |
|---|---|---|---|
| 2013/0039291 A1 | 2/2013 | Blankenship et al. | |
| 2013/0155914 A1* | 6/2013 | Wang | H04L 5/001 |
| | | | 370/280 |
| 2013/0176918 A1* | 7/2013 | Fu | H04B 7/0404 |
| | | | 370/280 |
| 2014/0029561 A1 | 1/2014 | Kim et al. | |
| 2014/0036853 A1 | 2/2014 | Kim et al. | |
| 2014/0036881 A1 | 2/2014 | Kim et al. | |
| 2014/0036889 A1 | 2/2014 | Kim et al. | |
| 2014/0071931 A1 | 3/2014 | Lee et al. | |
| 2014/0112277 A1 | 4/2014 | Yang et al. | |
| 2014/0112289 A1 | 4/2014 | Kim et al. | |
| 2014/0112300 A1 | 4/2014 | Han et al. | |
| 2014/0301299 A1 | 10/2014 | Wu | |
| 2016/0381561 A1* | 12/2016 | Yang | H04W 16/02 |
| | | | 370/329 |

OTHER PUBLICATIONS

Nokia Networks, Nokia Corporation, "Short Control Signalling for LTE LAA", 3GPP TSG-RAN WG1 Meeting #78bis, R1-144186, Oct. 2014.

Nokia Networks, Nokia Corporation, "Listen Before Talk and Channel Access", 3GPP TSG RAN WG1 Meeting #78bis, R1-144187, Oct. 2014.

Huawei, HiSilicon, "Potential solutions for LAA-LTE design", 3GPP TSG RAN WG1 Meeting #78bis, R1-143726, Oct. 2014.

Samsung, "Discussion on solutions for required functionalities and design targets for LAA", 3GPP TSG RAN WG1 #78bis, R1-143879, Oct. 2014.

Motorola Mobility, "Physical Layer options for LAA-LTE", 3GPP TSG RAN WG1 #78bis, R1-144236, Oct. 2014.

3GPP TS 36.213 V8.6.0, "Evolved Universal Terrestrial Radio Access (E-UTRA) Physical layer procedures," Mar. 2009.

3GPP TS 36.211. v12.7.0, Evolved Universal Terrestrial Radio Access (E-UTRA); Physical channels and modulation (Release 12); Sep. 2015.

3GPP TS 36.331, version 12.7.0, Evolved Universal Terrestrial Radio Access (E-UTRA); Radio Resource Control (RRC); Protocol specification (Release 12), Sep. 2015.

Search Report and Written Opinion issued for International Application No. PCT/US2015/059963, dated Feb. 23, 2016.

* cited by examiner

SYSTEMS AND METHODS FOR LICENSE ASSISTED ACCESS

RELATED APPLICATIONS

This application is related to and claims priority from U.S. Provisional Patent Application No. 62/078,324, entitled "SYSTEMS AND METHODS FOR LICENSE ASSISTED ACCESS" filed on Nov. 11, 2014, which is hereby incorporated by reference herein, in its entirety.

TECHNICAL FIELD

The present disclosure relates generally to communication systems. More specifically, the present disclosure relates to systems and methods for licensed assisted access (LAA).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
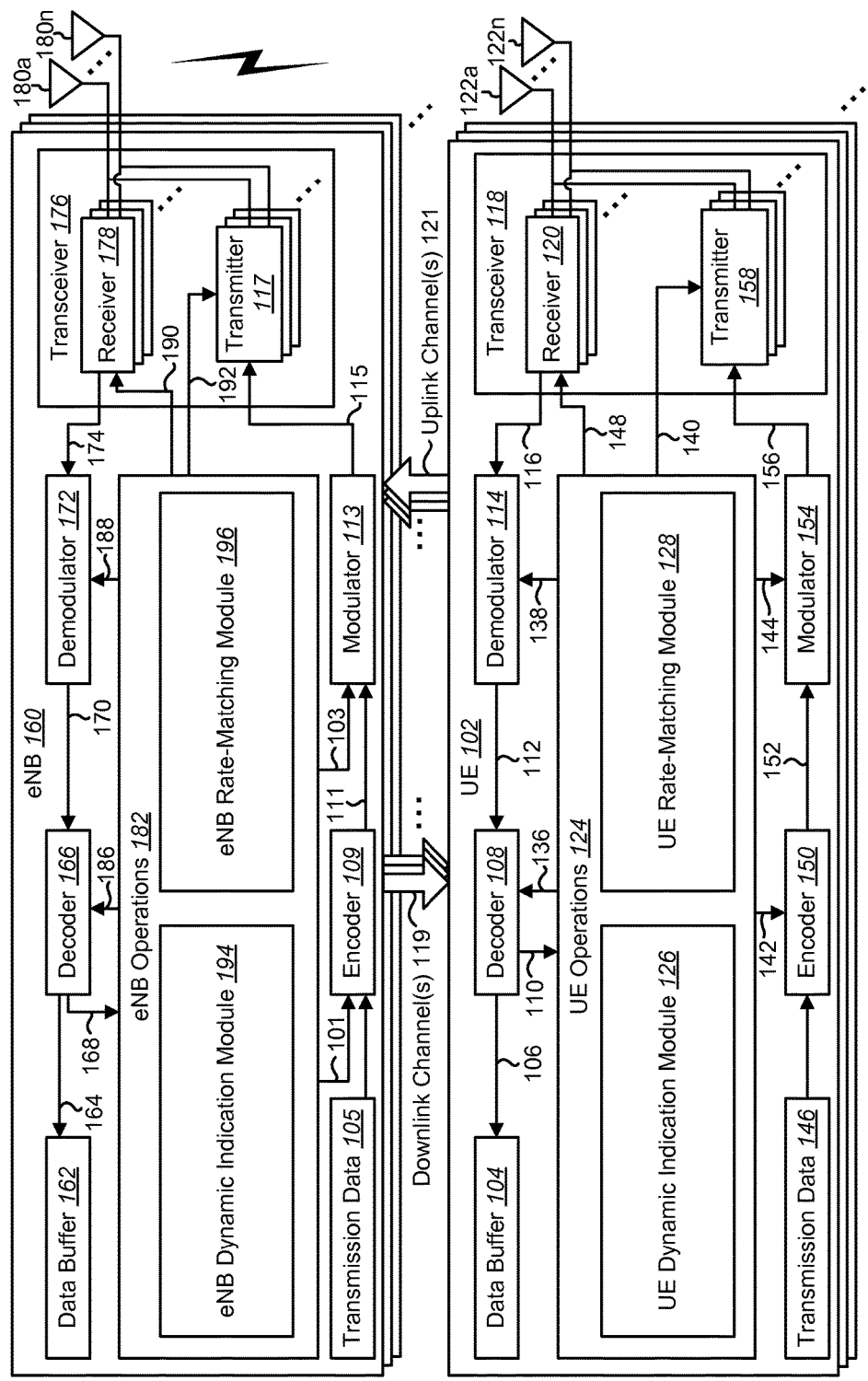
FIG. 1 is a block diagram illustrating one implementation of one or more evolved NodeBs (eNBs) and one or more user equipments (UEs) in which systems and methods for LAA may be implemented.

A user equipment (UE) is described. The UE includes a higher layer processor configured to receive a radio resource control (RRC) message to specify subframes for a channel state information-reference signal (CSI-RS). The UE also includes a control channel receiver configured to monitor a first control channel and a second control channel in a subframe. The first control channel indicates whether the CSI-RS in the subframe is available for CSI measurement. The second control channel is a control channel of which detection indicates a transmission of a shared channel in the subframe. The UE further includes a shared channel receiver configured to receive the shared channel when the second control channel is detected.

The higher layer processor of the UE may be further configured to receive a RRC message to configure a first serving cell as a scheduling cell for a second serving cell. The second serving cell may be a serving cell on which the shared channel is received. The control channel receiver may be configured, upon a configuration of the first serving cell, to monitor the first control channel on the second serving cell and to monitor the second control channel on the first serving cell.

The control channel receiver of the UE may be configured, if a cross carrier scheduling is not configured for a serving cell on which the shared channel is received, to monitor the first control channel and the second control channel on the serving cell.

The first control channel may further indicate the number of remaining consecutive subframes in a burst in which the subframe is included.

An evolved node B (eNB) is also described. The eNB includes a higher layer processor configured to transmit a RRC message to specify subframes for a CSI-RS. The eNB also includes a control channel transmitter configured to transmit a first control channel and a second control channel in a subframe. The first control channel indicates whether the CSI-RS in the subframe is available for CSI measurement. The second control channel is a control channel of which detection indicates a transmission of a shared channel in the subframe. The eNB further includes a shared channel transmitter configured to transmit the shared channel when the second control channel is transmitted.

The higher layer processor of the eNB may be further configured to transmit a RRC message to specify a first serving cell as a scheduling cell for a second serving cell. The second serving cell may be a serving cell on which the shared channel is transmitted. The control channel transmitter may be configured, upon a configuration of the first serving cell, to transmit the first control channel on the second serving cell and to transmit the second control channel on the first serving cell.

The control channel transmitter of the eNB may be configured, if a cross carrier scheduling is not configured for a serving cell on which the shared channel is transmitted, to transmit the first control channel and the second control channel on the serving cell.

A method in a UE is also described. The method includes receiving a RRC message to specify subframes for a CSI-RS. The method also includes monitoring a first control channel and a second control channel in a subframe. The first control channel may indicate whether the CSI-RS in the subframe is available for CSI measurement. The second control channel may be a control channel of which detection indicates a transmission of a shared channel in the subframe. The method may further include receiving the shared channel when the second control channel is detected.

A method in an eNB is also described. The method includes transmitting an RRC message to specify subframes for a CSI-RS. The method also includes transmitting a first control channel and a second control channel in a subframe. The first control channel indicating whether the CSI-RS in the subframe is available for CSI measurement. The second control channel is a control channel of which detection indicates a transmission of a shared channel in the subframe. The method further includes transmitting the shared channel when the second control channel is transmitted.

Another UE is described. The UE includes a higher layer processor configured to receive an RRC message to configure monitoring of a first PDCCH. The first PDCCH is a PDCCH for indicating that a subframe is available for downlink transmission. The UE also includes a control channel receiver configured to monitor the first PDCCH when monitoring of the first PDCCH is configured, and to monitor a second PDCCH in the subframe. The second PDCCH is a PDCCH of which detection indicates a transmission of a PDSCH in the subframe. The UE further includes a shared channel receiver configured to receive the PDSCH when the first PDCCH and the second PDCCH is detected.

When cross-carrier scheduling is not configured for a secondary cell on which the PDSCH is received, the first PDCCH may be monitored on a primary cell and the second PDCCH may be monitored on the secondary cell. Alternatively, when cross-carrier scheduling is not configured for a secondary cell on which the PDSCH is received, the first PDCCH may be monitored on the secondary cell and the second PDCCH may be monitored on the secondary cell.

When cross-carrier scheduling is configured for a secondary cell on which the PDSCH is received and a scheduling cell for the secondary cell is a primary cell, the first PDCCH may be monitored on the primary cell and the second PDCCH may be monitored on the primary cell. Alternatively, when cross-carrier scheduling is configured for a secondary cell on which the PDSCH is received and a scheduling cell for the secondary cell is a primary cell, the first PDCCH may be monitored on the secondary cell and the second PDCCH may be monitored on the primary cell.

The first PDCCH may be monitored on a common search space.

Another eNB is described. The eNB includes a higher layer processor configured to transmit an RRC message to configure a UE's monitoring of a first PDCCH. The first PDCCH is a PDCCH for indicating that a subframe is available for downlink transmission. The eNB also includes a control channel transmitter configured to transmit the first PDCCH when the monitoring of the first PDCCH is configured, and to transmit a second PDCCH in the subframe. The second PDCCH is a PDCCH of which detection indicates a transmission of a PDSCH in the subframe. The eNB further includes a shared channel transmitter configured to transmit the PDSCH when the first PDCCH and the second PDCCH are transmitted.

When cross-carrier scheduling is not configured for a secondary cell on which the PDSCH is transmitted, the first PDCCH may be transmitted on a primary cell and the second PDCCH may be transmitted on the secondary cell. Alternatively, when cross-carrier scheduling is not configured for a secondary cell on which the PDSCH is transmitted, the first PDCCH may be transmitted on the secondary cell and the second PDCCH may be transmitted on the secondary cell.

When cross-carrier scheduling is configured for a secondary cell on which the PDSCH is transmitted and a scheduling cell for the secondary cell is a primary cell, the first PDCCH may be transmitted on the primary cell and the second PDCCH may be transmitted on the primary cell. Alternatively, when cross-carrier scheduling is configured for a secondary cell on which the PDSCH is transmitted and a scheduling cell for the secondary cell is a primary cell, the first PDCCH may be transmitted on the secondary cell and the second PDCCH may be transmitted on the primary cell.

The first PDCCH may be transmitted on a common search space. The first PDCCH may be transmitted on another subframe than any subframes in which the eNB performs a clear channel assessment process.

Another UE is described. The UE includes a higher layer processor configured to receive a first RRC message specifying subframes in which a first signal potentially exists, and to receive a second RRC message to configure monitoring of a first PDCCH. The first PDCCH is a PDCCH for indicating that the first signal exists in a subframe. The subframe is one of the subframes specified by the first RRC message. The UE also includes a control channel receiver configured to monitor the first PDCCH when monitoring of the first PDCCH is configured. The UE further includes a signal receiver configured to receive the first signal in the subframe when the first PDCCH is detected.

In an implementation, the first PDCCH may be monitored on a primary cell, and the first signal may be received on a secondary cell. In another implementation, the first PDCCH may be monitored on a secondary cell, and the first signal may be received on the secondary cell.

In yet another implementation, the first signal may be received on the secondary cell. When cross-carrier scheduling is not configured for the secondary cell, the first PDCCH may be monitored on the secondary cell. When cross-carrier scheduling is configured for the secondary cell and a scheduling cell for the secondary cell is a primary cell, the first PDCCH may be monitored on the primary cell. In another implementation, the first PDCCH is monitored on a common search space.

The first signal in the subframe may not be used for CSI measurement when the first PDCCH is not detected.

Another eNB is described. The eNB includes a higher layer processor configured to transmit a first RRC message specifying subframes in which a first signal potentially exists, and to transmit an second RRC message to configure a UE's monitoring of a first PDCCH. The first PDCCH may be a PDCCH for indicating that the first signal exists in a subframe. The subframe may be one of the subframes specified by the first RRC message. The eNB also includes a control channel transmitter configured to transmit the first PDCCH when monitoring of the first PDCCH is configured. The eNB further includes a signal transmitter configured to transmit the first signal in the subframe when the first PDCCH is transmitted.

In an implementation, the first PDCCH is transmitted on a primary cell, and the first signal is transmitted on a secondary cell. In another implementation, the first PDCCH is transmitted on a secondary cell, and the first signal is transmitted on the secondary cell.

In yet another implementation, the first signal is transmitted on the secondary cell. When cross-carrier scheduling is not configured for the secondary cell, the first PDCCH is transmitted on the secondary cell. When cross-carrier scheduling is configured for the secondary cell and a scheduling cell for the secondary cell is a primary cell, the first PDCCH is transmitted on the primary cell.

In another implementation, the first PDCCH is transmitted on common search space.

Another UE is described. The UE includes a higher layer processor configured to receive an RRC message to configure monitoring of a first PDCCH. The first PDCCH is a PDCCH carrying 2-state information. The UE also includes a control channel receiver configured to monitor the first PDCCH when monitoring of the first PDCCH is configured. A first state of the 2-state information indicates the UE shall assume a downlink transmission on a secondary cell in a given subframe. A second state of the 2-state information indicates the UE shall not assume downlink transmission(s) on the secondary cell in the given subframe and later subframe(s) within a transmission burst.

Another UE is described. The UE includes a higher layer processor configured to receive an RRC message to configure monitoring of a first PDCCH. The first PDCCH is a PDCCH carrying information taking one of at least N states, where N is a natural number. The UE also includes a control channel receiver configured to monitor the first PDCCH when monitoring of the first PDCCH is configured. Each of a first state to a N−1th state of the N-state information indicates the UE shall assume downlink transmission(s) on the secondary cell in consecutive 1 to N−1 subframe(s) starting with a given subframe within a transmission burst. An Nth state of the N-state information indicates the UE shall not assume downlink transmission(s) on the secondary cell in the given subframe and later subframe(s) within the transmission burst.

Another UE is described. The UE includes a higher layer processor configured to receive an RRC message to configure monitoring of a first PDCCH. The first PDCCH is a PDCCH carrying information taking one of at least N states, where N is a natural number. The UE also includes a control channel receiver configured to monitor the first PDCCH when monitoring of the first PDCCH is configured. A first state of the N-state information indicates the UE shall assume a transmission of a first signal on a secondary cell in a given subframe. A second state of the N-state information indicates the UE shall assume a transmission of a second signal on the secondary cell in the given subframe. A third state of the N-state information indicates the UE shall assume downlink transmission of neither the first signal nor the second signal on the secondary cell in the given subframe.

Another UE is described. The UE includes a higher layer processor configured to receive a first RRC message to configure monitoring of a first PDCCH, and to receive a second RRC message to configure a plurality of sets of parameters for a first signal. The first PDCCH is a PDCCH carrying information taking one of at least N states, where N is a natural number. The UE also includes a control channel receiver configured to monitor the first PDCCH when monitoring of the first PDCCH is configured. A first state of the N-state information indicates the UE shall assume a transmission of the first signal that is based on the first set of the plurality of sets, on a secondary cell in a given subframe. A second state of the N-state information indicates the UE shall assume a transmission of the first signal that is based on the second set of the plurality of sets, on the secondary cell in the given subframe. A third state of the N-state information indicates the UE shall not assume downlink transmission of the first signal on the secondary cell in the given subframe.

The first signal may be a CSI-RS. The parameters may include at least one of a physical cell identity, a pseudo-random sequence generator parameter, a CSI-RS resource configuration identity, the number of CSI-RS ports, a CSR-RS configuration, a CSI-RS subframe configuration, an assumption on reference PDSCH transmitted power for CSI feedback and a quasi co-location assumption.

The first signal may be a cell-specific reference signal (CRS). The parameters may include at least one of a physical cell identity, the number of CRS ports a frequency shift and a multicast/broadcast over single frequency network (MB-SFN) subframe configuration.

Another eNB is described. The eNB includes a higher layer processor configured to transmit an RRC message to configure a UE's monitoring of a first PDCCH. The first PDCCH is a PDCCH carrying 2-state information. The eNB also includes a control channel transmitter configured to transmit the first PDCCH when monitoring of the first PDCCH is configured. A first state of the 2-state information indicates the UE shall assume a downlink transmission on a secondary cell in a given subframe. A second state of the 2-state information indicates the UE shall not assume downlink transmission(s) on the secondary cell in the given subframe and later subframe(s) within a transmission burst.

Another eNB is described. The eNB includes a higher layer processor configured to transmit an RRC message to configure a UE's monitoring of a first PDCCH. The first PDCCH is a PDCCH carrying information taking one of at least N states, wherein N is a natural number. The eNB also includes a control channel transmitter configured to transmit the first PDCCH when monitoring of the first PDCCH is configured. Each of a first state to a N−1th state of the N-state information indicates the UE shall assume downlink transmission(s) on the secondary cell in consecutive 1 to N−1 subframe(s) starting with a given subframe within a transmission burst. An Nth state of the N-state information indicates the UE shall not assume downlink transmission(s)

on the secondary cell in the given subframe and later subframe(s) within the transmission burst.

Another eNB is described. The eNB includes a higher layer processor configured to transmit an RRC message to configure a UE's monitoring of a first PDCCH. The first PDCCH is a PDCCH carrying information taking one of at least N states, where N is a natural number. The eNB also includes a control channel transmitter configured to transmit the first PDCCH when monitoring of the first PDCCH is configured. A first state of the N-state information indicates the UE shall assume a transmission of a first signal on a secondary cell in a given subframe. A second state of the N-state information indicates the UE shall assume a transmission of a second signal on the secondary cell in the given subframe. A third state of the N-state information indicates the UE shall assume downlink transmission of neither the first signal nor the second signal on the secondary cell in the given subframe.

Another eNB is described. The eNB includes a higher layer processor configured to transmit a first RRC message to configure a UE's monitoring of a first PDCCH, and to transmit a second RRC message to configure a plurality of sets of parameters for a first signal. The first PDCCH is a PDCCH carrying information taking one of at least N states, where N is a natural number. The eNB also includes a control channel transmitter configured to transmit the first PDCCH when monitoring of the first PDCCH is configured. A first state of the N-state information indicates the UE shall assume a transmission of the first signal which is based on the first set of the plurality of sets, on a secondary cell in a given subframe. A second state of the N-state information indicates the UE shall assume a transmission of the first signal which is based on the second set of the plurality of sets, on the secondary cell in the given subframe. A third state of the N-state information indicates the UE shall not assume downlink transmission of the first signal on the secondary cell in the given subframe.

Another UE is described. The UE includes a higher layer processor configured to receive a first RRC message to configure monitoring of a first PDCCH and to receive a second RRC message to configure a reference signal configuration. The first PDCCH is a PDCCH for indicating that the user equipment assumes a downlink transmission of a reference signal in a given subframe. The UE also includes a control channel receiver configured to monitor the first PDCCH when monitoring of the first PDCCH is configured. The UE further includes a PDSCH decoder configured to use the reference signal configuration for determining a PDSCH resource element mapping in the given subframe regardless of whether or not the first PDCCH is detected.

Another UE is described. The UE includes a higher layer processor configured to receive a first RRC message to configure monitoring of a first PDCCH and to receive a second RRC message to configure a reference signal configuration. The first PDCCH is a PDCCH for indicating that the UE assumes a downlink transmission of a reference signal in a given subframe. The UE also includes a control channel receiver configured to monitor the first PDCCH when monitoring of the first PDCCH is configured. The UE further includes a PDSCH decoder configured to determine a PDSCH resource element mapping in the given subframe without using the reference signal configuration regardless of whether or not the first PDCCH is detected.

Another UE is described. The UE includes a higher layer processor configured to receive a first RRC message to configure monitoring of a first PDCCH and to receive a second RRC message to configure a reference signal configuration. The first PDCCH is a PDCCH for indicating that the UE assumes a downlink transmission of a reference signal in a given subframe. The UE also includes a control channel receiver configured to monitor the first PDCCH when monitoring of the first PDCCH is configured. The UE further includes a PDSCH decoder configured to use the reference signal configuration for determining a PDSCH resource element mapping in the given subframe when the first PDCCH is detected, and to determine the PDSCH resource element mapping in the given subframe without using the reference signal configuration when the first PDCCH is not detected.

Another UE is described. The UE includes a higher layer processor configured to receive a first RRC message to configure monitoring of a first PDCCH, to receive a second RRC message to configure a reference signal configuration and to receive a third RRC message to configure a plurality of parameter sets for a PDSCH resource element mapping configuration and quasi-co-location. The first PDCCH is a PDCCH for indicating that the UE assumes a downlink transmission of a reference signal in a subframe. The UE also includes a control channel receiver configured to monitor the first PDCCH when monitoring of the first PDCCH is configured, and to monitor a second PDCCH in the subframe. The second PDCCH is a PDCCH of which detection indicates a transmission of a PDSCH in the subframe. The second PDCCH has a field for indicating one of the plurality of parameter sets. The UE further includes a signal receiver configured to receive the first signal in the subframe on the basis of the reference signal configuration when the first PDCCH is detected. The UE additionally includes a PDSCH decoder configured to use the indicated one of the plurality of parameter sets for determining a PDSCH resource element mapping in the given subframe.

Another eNB is described. The eNB includes a higher layer processor configured to transmit a first RRC message to configure a UE's monitoring of a first PDCCH and to transmit a second RRC message to configure a reference signal configuration. The first PDCCH is a PDCCH for indicating that the UE assumes a downlink transmission of a reference signal in a given subframe. The eNB also includes a control channel transmitter configured to transmit the first PDCCH when the monitoring of the first PDCCH is configured. The eNB further includes a PDSCH encoder configured to use the reference signal configuration for determining a PDSCH resource element mapping in the given subframe regardless of whether or not the first PDCCH is transmitted.

Another eNB is described. The eNB includes a higher layer processor configured to transmit a first RRC message to configure a UE's monitoring of a first PDCCH and to transmit a second RRC message to configure a reference signal configuration. The first PDCCH is a PDCCH for indicating that the UE assumes a downlink transmission of a reference signal in a given subframe. The eNB also includes a control channel transmitter configured to transmit the first PDCCH when monitoring of the first PDCCH is configured. The eNB further includes a PDSCH mapper configured to determine a PDSCH resource element mapping in the given subframe without using the reference signal configuration regardless of whether or not the first PDCCH is detected.

Another eNB is described. The eNB includes a higher layer processor configured to transmit a first RRC message to configure a UE's monitoring of a first PDCCH and to transmit a second RRC message to configure a reference signal configuration. The first PDCCH is a PDCCH for indicating that the UE assumes a downlink transmission of a reference signal in a given subframe. The eNB also includes a control channel transmitter configured to transmit the first PDCCH when the monitoring of the first PDCCH is configured. The eNB further includes a PDSCH mapper configured to use the reference signal configuration for determining a PDSCH resource element mapping in the given subframe when the first PDCCH is detected, and to determine the PDSCH resource element mapping in the given subframe without using the reference signal configuration when the first PDCCH is not detected.

Another eNB is described. The eNB includes a higher layer processor configured to transmit a first RRC message to configure a UE's monitoring of a first PDCCH, to receive a second RRC message to configure a reference signal configuration and to transmit a third RRC message to configure a plurality of parameter sets for a PDSCH resource element mapping configuration and quasi-co-location. The first PDCCH is a PDCCH for indicating that the UE assumes a downlink transmission of a reference signal in a subframe. The eNB also includes a control channel transmitter configured to transmit the first PDCCH when the monitoring of the first PDCCH is configured, and to transmit a second PDCCH in the subframe. The second PDCCH is a PDCCH of which detection indicates a transmission of a PDSCH in the subframe. The second PDCCH has a field for indicating one of the plurality of parameter sets. The eNB further includes a signal transmitter configured to transmit the first signal in the subframe on the basis of the reference signal configuration when the first PDCCH is detected. The eNB additionally includes a PDSCH mapper configured to use the indicated one of the plurality of parameter sets for determining a PDSCH resource element mapping in the given subframe.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation. Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

An FDD cell requires spectrum (e.g., radio communication frequencies or channels) in which contiguous subsets of the spectrum are entirely allocated to either UL or DL but not both. Accordingly, FDD may have carrier frequencies that are paired (e.g., paired DL and UL carrier frequencies). However, TDD does not require paired channels. Instead, TDD may allocate UL and DL resources on the same carrier frequency. Therefore, TDD may provide more flexibility on spectrum usage. With the increase in wireless network traffic, and as spectrum resources become very precious, new allocated spectrum tends to be fragmented and has smaller bandwidth, which is more suitable for TDD and/or small cell deployment. Furthermore, TDD may provide flexible channel usage through traffic adaptation with different TDD UL/DL configurations and dynamic UL/DL re-configuration.

Licensed-assisted access (LAA) may support LTE in unlicensed spectrum. In a LAA network, the DL transmission may be scheduled in an opportunistic manner. For fairness utilization, an LAA eNB may perform functions such as clear channel assessment (CCA), listen before talk (LBT) and dynamic frequency selection (DFS). Thus, a LAA transmission may not guarantee a DL transmission in the fixed subframe location that contains the DL signals.

In a LAA system, an eNB may perform CCA before transmission. Thus, a subframe with a configured CSI resource may not be able to be transmitted following the configuration. For CSI measurement, UEs have to know which subframes and/or signals are actually transmitted. Otherwise, at both the network and UE side, it cannot be identified whether the CSI is based on the reference signals that are actually transmitted or not.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for LAA may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE dynamic indication module 126 and a UE rate-matching module 128.

In order to share the same knowledge about whether a given signal is actually transmitted or not between the network and UEs 102, a dynamic indication of a DL transmission may be introduced. The eNB 160 may transmit the dynamic indication to the UE 102 through a PDCCH or an enhanced PDCCH (EPDCCH). The UE 102 may monitor the PDCCH or EPDCCH to detect the dynamic indication. If detected, the UE 102 may assume the DL transmission is present. This assumption may be applied to a CSI measurement procedure, PDSCH demapping/decoding procedure, PDSCH demodulation procedure and so on.

The UE dynamic indication module 126 may receive a dynamic indication. The eNB 160 may send the UE 102 information indicating the presence of the signal/channel. In one approach, CCA may be performed by the eNB 160 within leading OFDM symbols (e.g. leading 3 OFDM symbols) within a subframe. Once the eNB 160 ensures that the channel is clear, the eNB 160 may transmit DL signals within consecutive N subframes (referred to as a burst) starting with the subframe in which the CCA is performed.

The first LAA subframe may be a subframe with reduced number of OFDM symbols due to the leading OFDM symbols for sensing. The maximum occupied time (i.e. N milliseconds (ms)) for an eNB 160 may be determined based on regional regulatory requirements. Furthermore, a primary cell (PCell) may be in a licensed carrier and one secondary cell (SCell) on a LAA carrier may be configured. It should be noted that the values discussed herein are just possible values and thus other values may be applied. For example, CCA may be done within 1 OFDM symbols and the maximum occupied time may be 10 ms. Also, these parameters may be configured by the eNB 160. Thus, the maximum occupied time (i.e. N ms) for an eNB 160 may be a fixed value (e.g. 4 subframes (4 ms)), or configured by the eNB 160. More than one LAA SCell may be configured.

In another approach, CCA is performed by the eNB 160 within several OFDM symbols of the previous subframe. In this approach, the first LAA subframe may be a complete subframe with all OFDM symbols. To avoid channel waste due to when CCA is the last several symbols of a subframe, the last several OFDM symbols of a LAA burst transmissions may be dropped.

Figure 2:
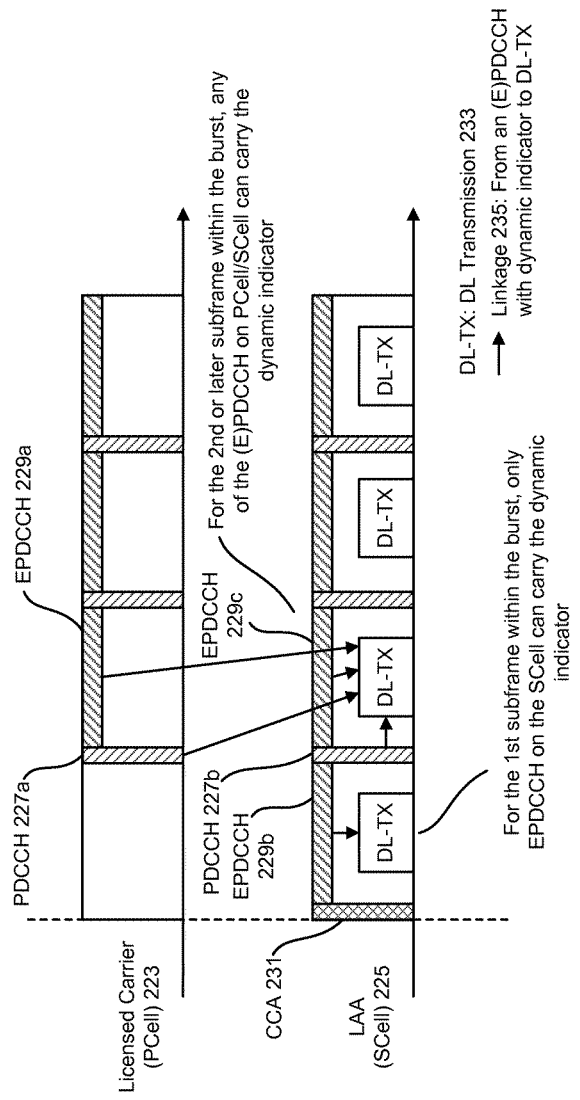
FIG. 2 is a block diagram showing possible schemes to transmit a dynamic indication.

Transmission data in a given subframe may be prepared (e.g. frequency scheduled, encoded and modulated) prior to a transmission subframe, since the preparation requires processing time. Therefore, (E)PDCCH on a licensed carrier in the subframe where the eNB 160 performs CCA on an LAA carrier may not indicate whether the LAA carrier has DL transmissions in that subframe. The eNB 160 may transmit a dynamic indication to the UE 102 to indicate whether a subframe is occupied by the eNB 160. FIG. 2 shows different schemes to transmit the dynamic indication.

On a LAA carrier, PDCCH is not transmitted in the subframe where the eNB 160 performs CCA because the CCA region overlaps the PDCCH region. On the other hand, EPDCCH can be transmitted on the LAA carrier in that subframe. Therefore, the EPDCCH may carry the dynamic indication. If the UE 102 detects that EPDCCH (with the dynamic indication), then the UE 102 knows the subframe is occupied by the eNB 160. If the UE 102 does not detect that EPDCCH, then the UE 102 knows the subframe is not occupied by the eNB 160.

An (E)PDCCH in a later subframe may carry the dynamic indication regardless of carrier type (e.g., licensed or unlicensed) because the eNB 160 may have time to prepare the transmission of the indication after CCA. Here, the indication may indicate the presence of some signal or channel within the subframe. Alternatively, the indication may indicate the presence of any signal or channel within the subframe (e.g., whether the subframe is occupied by the eNB 160 that the UE 102 communicates with). In other words, the dynamic indication may indicate whether or not the subframe supports a PDSCH transmission. This may also mean that the UE 102 does not assume any DL transmission in the subframe unless the presence is indicated by the dynamic indication.

Moreover, detection of the (E)PDCCH carrying the dynamic indication may indicate the presence of the signals/channels. Alternatively, the (E)PDCCH carrying the dynamic indication may have a field to indicate either the presence or non-presence of signals or channels. For example, a "0" may mean non-presence and a "1" may mean presence of signals or channels.

The transmission of the dynamic indication may follow different options. In a first option (also referred to as Option-1), a PDCCH on a common search space (CSS) carries the dynamic indication. In this option, the LAA subframe indication (e.g., the dynamic indication) may be carried on a licensed cell (e.g., a PCell or a primary secondary cell (PSCell)). In the case where the CCA is carried in the leading OFDM symbols of a subframe, the dynamic indication may not be present in the first LAA subframe. In this case, the dynamic indication may be included in all continuous subframes in a LAA subframe burst. In the case where the CCA is carried in the OFDM symbols of a previous subframe, the dynamic indication may be present in every subframe in a LAA subframe burst. An example of the first option is described in connection with FIG. 3 below.

In a second option (also referred to as Option-2), PDCCH on LAA-CSS may carry the dynamic indication. In this option, the LAA subframe indication (e.g., the dynamic indication) may be carried on a PDCCH in a LAA-CSS. In the case where the CCA is carried in the leading OFDM symbols of a subframe, the dynamic indication may not be present in the first LAA subframe. In this case, the dynamic indication may be included in all continuous subframes in a LAA subframe burst. In the case where the CCA is carried in the OFDM symbols of a previous subframe, the dynamic indication may be present in every subframe in a LAA subframe burst. An example of the second option is described in connection with FIG. 4 below.

In a third option (also referred to as Option-3), an EPDCCH on a LAA-enhanced CSS (LAA-ECSS) may carry the dynamic indication. In this option, the LAA subframe indication is carried on an EPDCCH in a LAA-ECSS. The indication may be present in every subframe in a LAA subframe burst. An example of the third option is described in connection with FIG. 5 below.

In a fourth option, the dynamic indication may be transmitted/monitored on UE-specific search space (USS). In one approach (referred to as Option 4-1), if the CCA is carried in the leading OFDM symbols of a subframe, the dynamic indication may not be present in the first LAA subframe, and may be included in all continuous subframes in a LAA subframe burst. If the CCA is carried in the OFDM symbols of a previous subframe, the indication may be present in every subframe in a LAA subframe burst. In another approach (referred to as Option 4-2), the indication may be present in every subframe in a LAA subframe burst. The LAA subframe indication is carried on a PDCCH or EPDCCH in a UE-specific search space (USS). An example of Option 4-1 is described in connection with FIG. 6 below. An example of Option 4-2 is described in connection with FIG. 7 below.

There may be two approaches to (E)PDCCH carrying a DL grant for a LAA PDSCH. In a first approach, cross-carrier scheduling is performed. In cross-carrier scheduling, a detection of an (E)PDCCH on a scheduling serving cell (e.g., a PCell in a licensed carrier) indicates a PDSCH transmission on a SCell (e.g., LAA carrier).

In a second approach, self-scheduling is performed. Self-scheduling may also be referred to as non-cross-carrier scheduling. In self-scheduling, a detection of an (E)PDCCH on a SCell (e.g., LAA carrier) indicates a PDSCH transmission on the SCell (LAA carrier). An example of cross-carrier scheduling and self-scheduling is described in connection with FIG. 8.

As in the above cases for the dynamic indication of the presence of a signal/channel, in self-scheduling only the EPDCCH on the LAA SCell is available for carrying the PDSCH assignment (e.g., DL grant) in the CCA subframe. Furthermore, any (E)PDCCH can carry the PDSCH assignment in other subframes within the burst regardless of whether cross-carrier scheduling is configured or not.

For self-scheduling, the indication is on an (E)PDCCH of a licensed scheduling cell. If the CCA is carried in the leading OFDM symbols of a subframe, the indication may not be present in the first LAA subframe, and may be included in all continuous subframes in a LAA subframe burst. If the CCA is carried in the OFDM symbols of a previous subframe, the indication may be present in every subframe in a LAA subframe burst.

A downlink control information (DCI) format of (E)PD-CCH carrying the dynamic indication may have a field that can express more than one state. It should be noted that, once an eNB 160 stops DL transmissions in the middle of a burst, the eNB 160 might not be allowed to transmit any signals within the same burst. In other words, the subframe(s) in which the eNB 160 is allowed to transmit any kinds of signals and channels might have to be consecutive subframe(s) starting with a CCA subframe.

Different configurations may be used to convey state information. In one configuration, an (E)PDCCH may carry 2-state information, as described in connection with FIG. 9. In another configuration, an (E)PDCCH may express at least X states, as described in connection with FIG. 10. In another configuration, an (E)PDCCH may express at least Y states, as described in connection with FIG. 11. In yet another configuration, an (E)PDCCH may express at least Z states, as described in connection with FIG. 12.

The UE rate-matching module 128 may perform rate-matching. PDSCH and EPDCCH may be sequentially mapped to resource elements (REs) on OFDM symbols other than a couple of leading OFDM symbols within a subframe. When some other signals such as CRS and CSI-RS are mapped in that region, there are at least two possible ways to avoid collisions between the signals and the PDSCH. One approach is to skip PDSCH mapping on such REs without an increment of the PDSCH symbol counter. This process may be referred to as "the signal is considered in rate-matching process" or more simply "the signals are rate-matched." The other approach is to skip PDSCH mapping on such REs with an increment of the PDSCH symbol counter. This causes the dropping of the PDSCH symbols that were supposed to be mapped on those REs. This process may be referred to as "the puncturing of the PDSCH symbols" or "the signals are not rate-matched."

The specifications for CSI-RS may be modified to accommodate LAA as described herein. In LTE license access, link adaptation (e.g., adaptive modulation and coding (AMC)) with various modulation schemes and channel coding rates may be adopted. The UE 102 may report channel state information (CSI) that includes a channel quality indicator (CQI), a precoding matrix indicator (PMI), a precoding type indicator (PTI), and/or a rank indication (RI) to the eNB 160. On the eNB 160 side, the CSI may be used for determining frequency resources assigned to the UE 102, the number of layers and MCS of PDSCH intended to the UE 102, etc. In some transmission modes (e.g., transition modes 8, 9 and 10), a CSI-reference signal (CSI-RS) may be used for CSI measurement. While CRS may be transmitted in every subframe, CSI-RS may be present in only some subframes that are pre-configured by UE-specific higher-layer signaling.

In one implementation, the CSI-RS may be formatted according to 3GPP specifications. However, the 3GPP specifications may be modified to accommodate LAA. 3GPP TS 36.211 states that the UE 102 shall assume that CSI reference signals are not transmitted in the special subframe(s) in case of frame structure type 2, in subframes where transmission of a CSI-RS would collide with SystemInformationBlockType1 messages, and in the primary cell in subframes configured for transmission of paging messages in the primary cell for any UE 102 with the cell-specific paging configuration. To accommodate LAA, 3GPP TS 36.211 may be changed to also state that the UE 102 shall assume that CSI reference signals are not transmitted in subframes where an (E)PDCCH associated with the CSI reference signals is not transmitted (or detected) when the UE 102 is configured by higher layer to monitor the associated (E)PDCCH.

3GPP TS 36.211 also states that the UE 102 shall assume that CSI reference signals are not transmitted in the special subframe(s) in case of frame structure type 2, in subframes where transmission of a CSI-RS would collide with SystemInformationBlockType1 messages, and in the primary cell in subframes configured for transmission of paging messages in the primary cell for any UE 102 with the cell-specific paging configuration. To accommodate LAA, 3GPP TS 36.211 may be changed to also state that the UE 102 shall assume that CSI reference signals are not transmitted in subframes where an (E)PDCCH associated with the CSI reference signals is not transmitted (or detected) when the UE 102 is configured by higher layer to monitor the associated (E)PDCCH, and in a subframe with nPresence=0 where nPresence is given by the presence field in the DCI associated with the CSI reference signals.

3GPP TS 36.331 may include an additional information element (IE) to accommodate LAA. The IE may be formatted according to Table 1.

TABLE 1

| LAA-PDCCH-Config information element |
|---|
| -- ASN1START |
| LAA-PDCCH-Config ::=    CHOICE { |
|   release                 NULL, |
|   setup                   SEQUENCE { |
|     max-occupied-time      ENUMERATED {n4, n10, n20, n40, n80, n160} |
|   } |
| } |
| -- ASN1STOP |

In Table 1, max-occupied-time is a field that indicates the maximum number of the occupied DL subframes for the LAA serving cell. The value n4 corresponds to 4 subframes, n10 to 10 subframes and so on.

The specifications for CQI may also be modified to accommodate LAA as described herein. In LTE license access, a CQI value is computed from results of channel measurement and interference measurement. The channel measurement may be performed by using reference signals within a given subframe. The channel measurement is a procedure to estimate the received power of PDSCH under the assumption that there is no interference. In one approach, the CQI may be derived by (1) combining channel vectors among REs on which RS s are mapped, (2) subtracting the vector derived in (1) from each of the channel vectors, and subtracting the mean amplitude of the vectors derived in (2) from the amplitude of the vector derived in (1). Meanwhile, an interference measurement may be normally performed by averaging reference signals across subframes so as to improve measurement accuracy. When CSI subframe sets are configured, the interference measurement per CSI subframe set may be done by averaging the reference signals across only the subframes that belong to that subframe set.

For a LAA carrier, the UE 102 can perform similar channel measurement as in the LTE license access. That is, the channel measurement may be performed by using reference signals within a given subframe. However, a difference is whether or not the reference signals are always transmitted. For instance, in the LTE license access, the UE 102 assumes that CRS is transmitted in every subframe as long as the cell is activated. Similarly, the UE 102 assumes that CSI-RS is always transmitted in the subframes that are pre-configured by higher layer signaling, once it is configured. On the other hand, the eNB 160 may not transmit CRS and CSI-RS in a certain subframe in an unlicensed carrier, since some other device may already occupy resources.

For the interference measurement, unlike the LTE license carrier, the LAA carrier is basically interference-free when the eNB 160 transmits DL signals, because the eNB 160 is allowed to transmit the DL signals only when the eNB 160 ensures (e.g., by performing CCA) that no other signal is transmitted by the other transmitter in the resource. This procedure is also referred to as listen before talk (LBT). If the UE 102 reports CSI based on outside of resources occupied by the eNB 160, that CSI depends on an unnecessary interference and does not represent an appropriate channel quality for the DL transmissions of the eNB 160. Hence, the interference measurement should be performed within the resources occupied by the eNB 160 so as to reflect an actual channel quality of the DL transmission from that eNB 160.

Therefore, for channel measurement in LAA carrier, it may be preferable to have some dynamic indication from the eNB 160 to the UE 102 that specifies whether or not a signal (e.g., CSI-RS, CRS, PSS/SSS, DRS) is actually transmitted in a given subframe. Moreover, for interference measurement in a LAA carrier, it may be preferable to restrict a measurement resource (also referred to as reference resource) to the subframes where the eNB 160 occupies communication resources (i.e. when the eNB 160 transmits some channels and/or signals).

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB dynamic indication module 194 and an eNB rate-matching module 196.

The eNB dynamic indication module 194 may transmit a dynamic indication to the UE 102. This may be accomplished as described above in connection with the UE dynamic indication module 126.

The eNB rate-matching module 196 may perform rate-matching with the UE 102. This may be accomplished as described above in connection with the UE rate-matching module 128.

The eNB operations module 182 may provide information 190 to the one or more receivers 178. For example, the eNB operations module 182 may inform the receiver(s) 178 when or when not to receive information based on the PSS and SSS.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on the PSS and SSS. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 is a block diagram showing possible schemes to transmit a dynamic indication. Subframes for a licensed carrier (PCell) 223 and corresponding subframes for a LAA (SCell) 225 burst are depicted. In FIGS. 2-8, the PDCCH 227 and EPDCCH 229 are indicated by shaded rectangles. Each arrow is a linkage 235 from that (E)PDCCH to a DL transmission (DL-TX) 233 of which presence is indicated by a dynamic indication. As described above, the dynamic indication is a kind of control signal that indicates the presence of some DL-TX 233 within the same subframe. The first subframe of the LAA burst may include a CCA 231 subframe.

In FIG. 2, for the first subframe within the LAA burst, only EPDCCH 229b on the SCell 225 can carry the dynamic indicator. For the second or later subframe within the LAA burst, any of the PDCCH 227a and EPDCCH 229a on the PCell 223 or the PDCCH 227b and EPDCCH 229c on the SCell 225 can carry the dynamic indicator.

Figure 3:
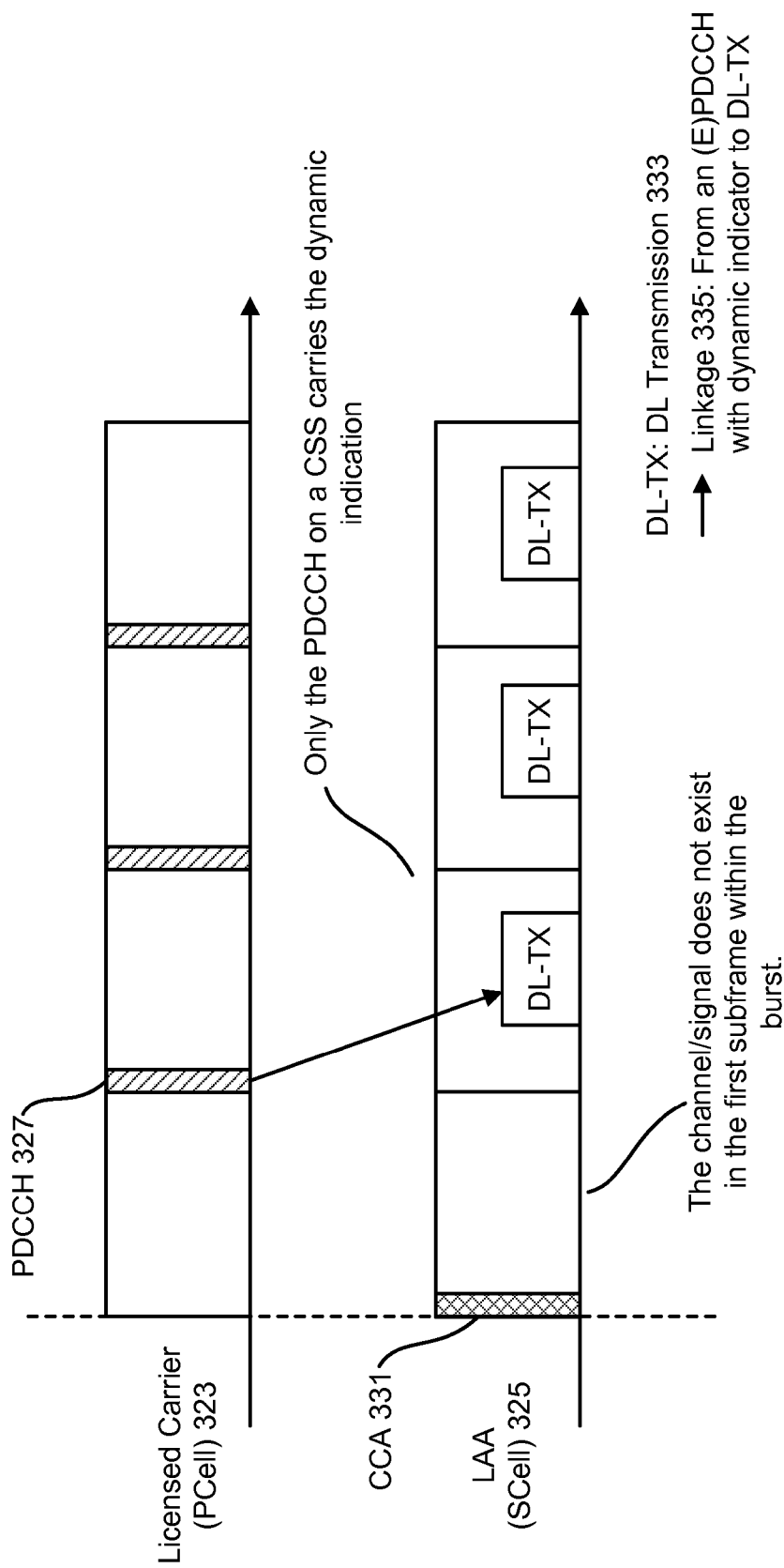
FIG. 3 shows an example of a first option for transmission of a dynamic indication.

FIG. 3 shows an example of a first option for transmission of a dynamic indication. In FIG. 3, the PDCCH 327 are indicated by shaded rectangles. Each arrow is a linkage 335 from that PDCCH 327 to a DL-TX 333 of which presence is indicated by a dynamic indication. The first subframe of the LAA 325 burst may include a CCA 331 subframe.

In the first option (e.g., Option-1), a PDCCH on the common search space (CSS) carries the dynamic indication. In the example shown in FIG. 3, the CCA 331 is carried in the leading OFDM symbols of a subframe. Whether the signal or channel is transmitted or not does not depend on the UE 102. Therefore, it may be preferable that a single indication can be detected by multiple UEs 102 (e.g., grouped UEs 102 or all UEs 102 that communicate with the eNB 160 on the LAA SCell 325).

The CSS may be used for an allocation of UE-common information. This information may include system information, paging information, random access response, a TDD configuration for eIMTA, UE-group-common TPC command, etc. The CSS can be set on a PCell 323 or PSCell. It should be noted that the PSCell is a SCell carrying a PUCCH within a secondary cell group (SCG) that is configured for dual connectivity access.

The PDCCH 327 carrying the dynamic indication may be transmitted and received in the CSS. This may alleviate the overhead of control signaling. In this option, the eNB 160 may not allocate the signal/channel (the presence of which may be indicated by the dynamic indication) in the CCA 331 subframe. Instead, the eNB 160 may allocate the signal/channel on a later subframe in the burst.

Figure 4:
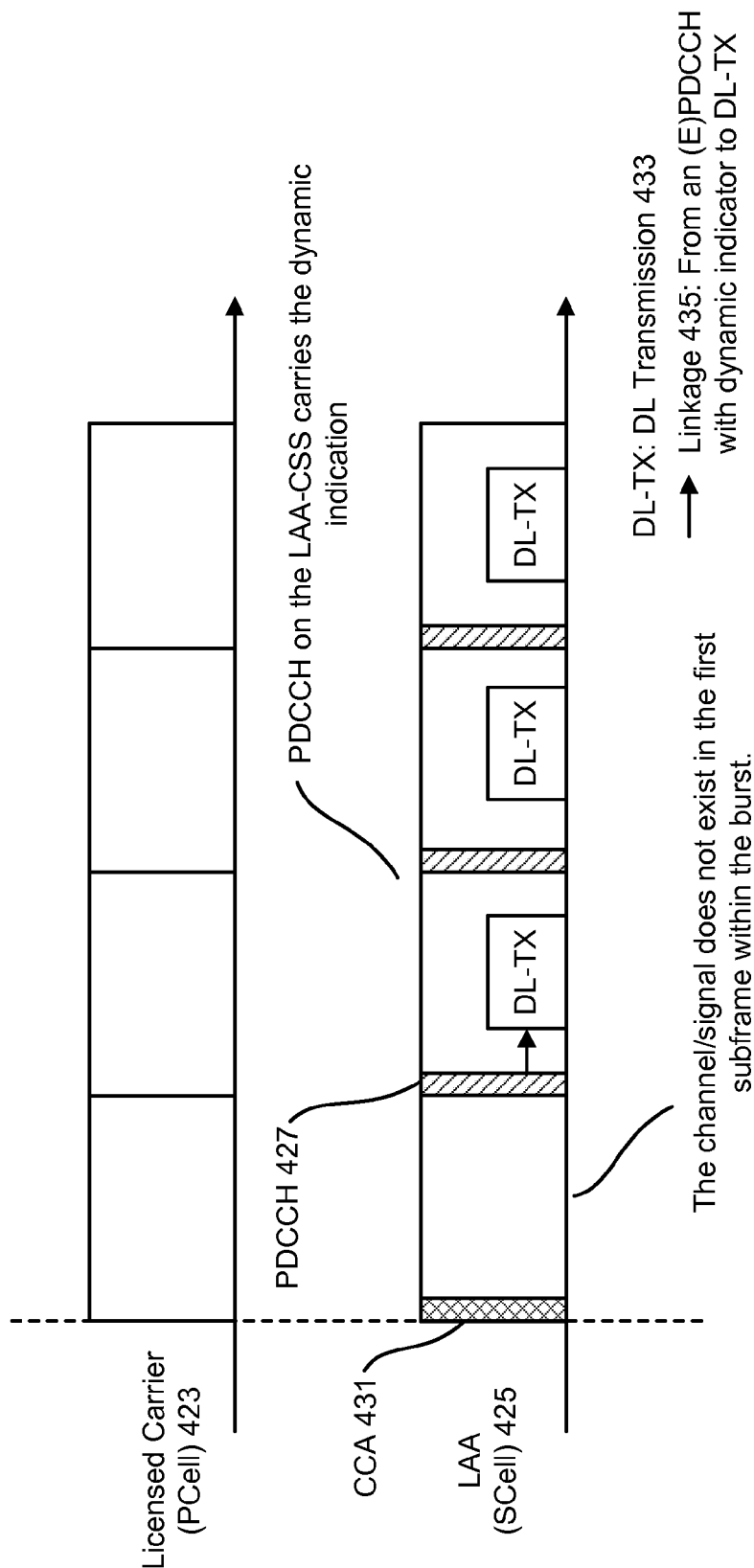
FIG. 4 shows an example of a second option for transmission of a dynamic indication.

FIG. 4 shows an example of a second option for transmission of a dynamic indication. In FIG. 4, the PDCCH 427 are indicated by shaded rectangles. Each arrow is a linkage 435 from that PDCCH 427 to a DL-TX 433 of which presence is indicated by a dynamic indication. The first subframe of the LAA 425 burst may include a CCA 431 subframe.

In the second option (e.g., Option-2), a PDCCH 427 on a LAA-CSS carries the dynamic indication. FIG. 4 shows an example with Option-2 when the CCA 431 is carried in the leading OFDM symbols of a subframe.

LAA-CSS may be a newly defined CSS that can be set on a SCell 425 other than the PCell 423 and the PSCell. The eNB 160 may send the UE 102 a dedicated RRC message for configuring LAA-CSS with respect to each SCell 425. Alternatively, if the UE 102 recognizes that a SCell 425 is operated in an unlicensed carrier, the UE 102 may monitor the LAA-CSS on that SCell 425 without a specific LAA-CSS configuration. LAA-CSS can be defined in the same manner as CSS on the PCell 423.

In this option, the eNB 160 may not allocate the signal/channel (the presence of which may be indicated by the dynamic indication) in the CCA 431 subframe. This may be because the PDCCH 427 carrying the indication is not allocated in the CCA 431 subframe. Instead, the eNB 160 may allocate the signal/channel on a later subframe in the burst.

Figure 5:
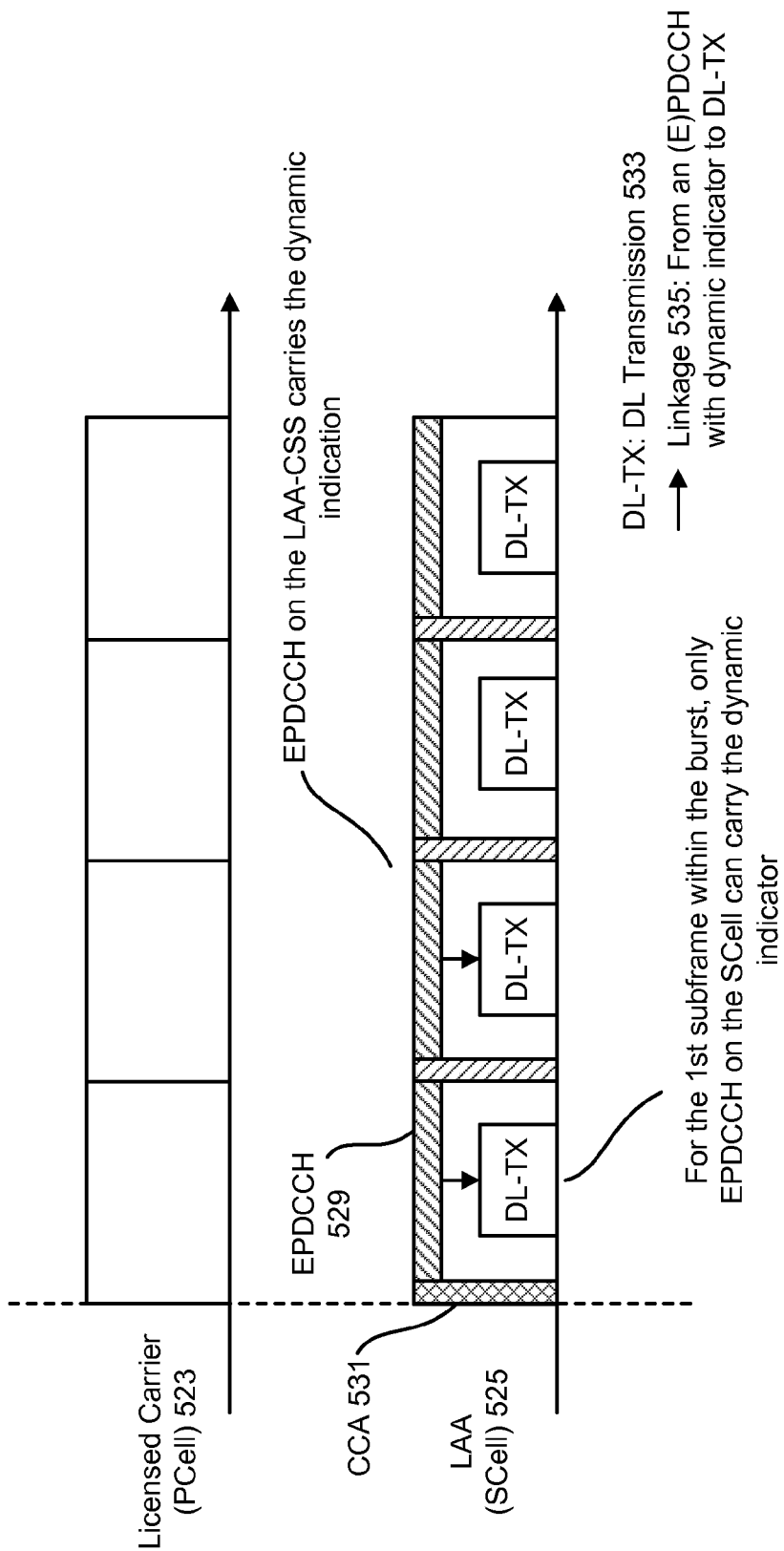
FIG. 5 shows an example of a third option for transmission of a dynamic indication.

FIG. 5 shows an example of a third option for transmission of a dynamic indication. In FIG. 5, the EPDCCH 529 are indicated by shaded rectangles. Each arrow is a linkage 535 from that EPDCCH 529 to a DL-TX 533 of which presence is indicated by a dynamic indication. The first subframe of the LAA 525 burst may include a CCA 531 subframe.

In this third option (e.g., Option-3), an EPDCCH 529 on a LAA-ECSS carries the dynamic indication. LAA-ECSS may be a newly defined enhanced CSS that can be set on a SCell 525 other than a PCell 523 and a PSCell. The eNB 160 may send the UE 102 a dedicated RRC message for configuring the LAA-ECSS with respect to each SCell 525. Alternatively, if the UE 102 recognizes that a SCell 525 is operating in an unlicensed carrier, the UE 102 may monitor the LAA-ECSS on that SCell 525 without an LAA-ECSS specific configuration.

Unlike LAA-CSS, LAA-ECSS may have a different mapping manner from CSS on the PCell 523. This may be because EPDCCH 529 (not PDCCH) is allocated/monitored there. Moreover, the eNB 160 may allocate the signal/channel (the presence of which may be indicated by the dynamic indication) in any subframe within the burst.

Figure 6:
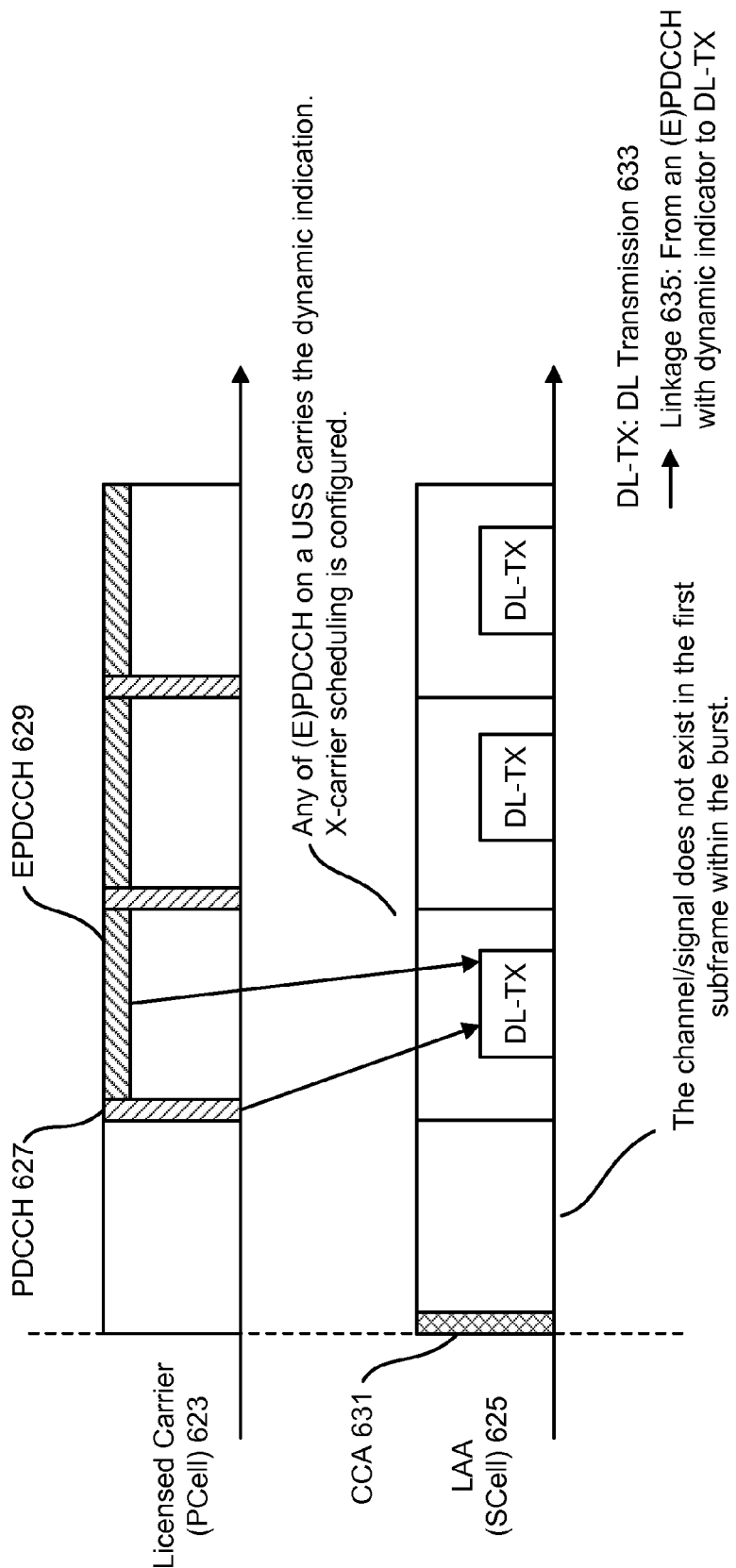
FIG. 6 shows an example of a fourth option for transmission of a dynamic indication.

FIG. 6 shows an example of a fourth option for transmission of a dynamic indication. Specifically, FIG. 6 shows one version of the fourth option (option 4-1). In FIG. 6, the PDCCH 627 and EPDCCH 629 are indicated by shaded rectangles. Each arrow is a linkage 635 from that PDCCH 627 and EPDCCH 629 to a DL-TX 633 of which presence is indicated by a dynamic indication. The first subframe of the LAA 625 burst may include a CCA 631 subframe.

In the fourth option, the LAA subframe indication (e.g., dynamic indication) is carried on a PDCCH 627 or an EPDCCH 629 in a USS. The USS may be used for an allocation of the PDSCH that contains UE-specific packet data. In option 4-1, the dynamic indication is on the PCell 623.

The USS for the dynamic indication may be defined using the same C-RNTI as in a PDSCH allocation. Alternatively, The USS for the dynamic indication may be defined using a specific RNTI (e.g. LAA-RNTI) that may be configured independently of C-RNTI. Also, the PDCCH 627 and EPDCCH 629 on the USS may be masked by using the specific RNTI in this instance. Similarly to Options 1-3 described above, only the EPDCCH 629 on the LAA SCell 625 is available for carrying the indication in the CCA 631 subframe while any PDCCH 627 or EPDCCH 629 can carry the indication in other subframes within the burst.

Figure 7:
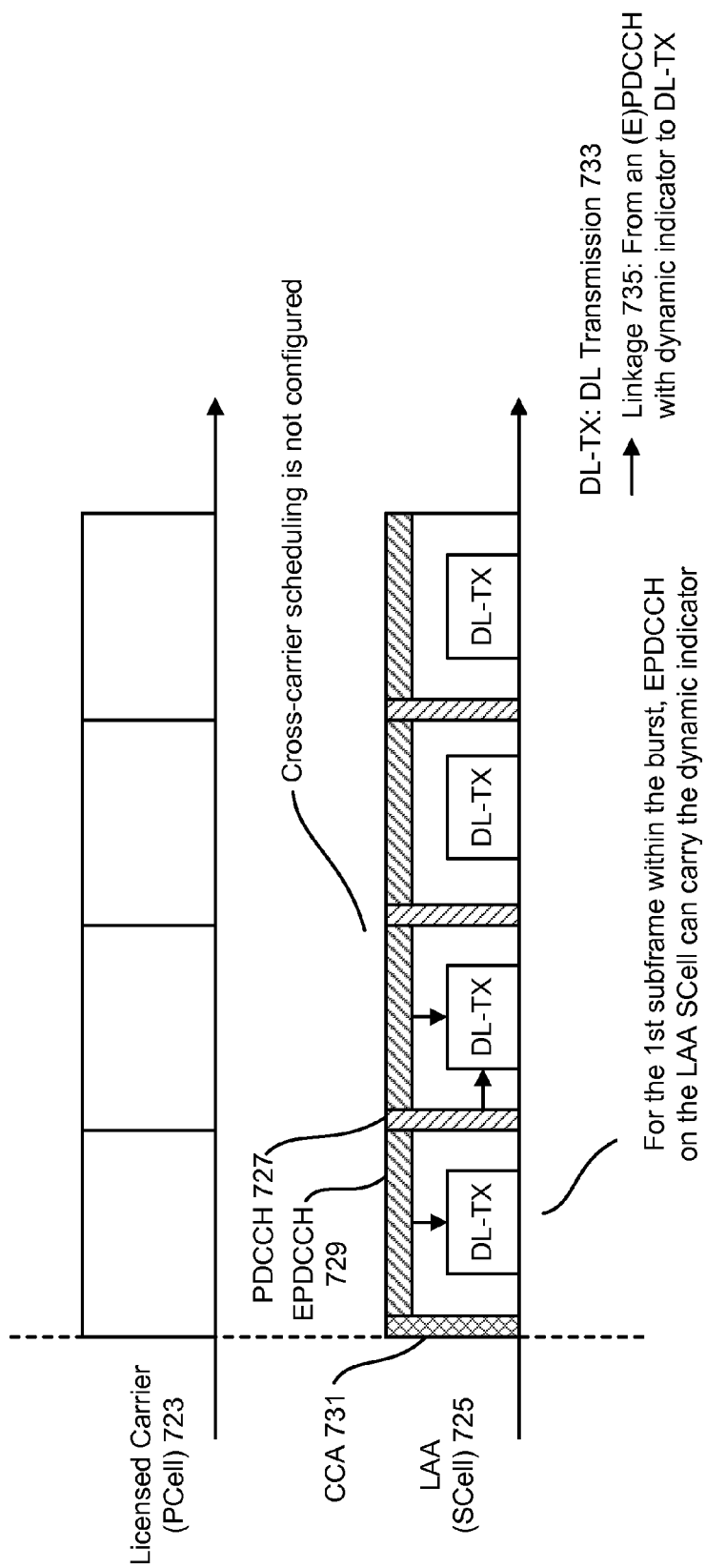
FIG. 7 shows another example of a fourth option for transmission of a dynamic indication.

FIG. 7 shows another example of a fourth option for transmission of a dynamic indication. Specifically, FIG. 7 shows another version of the fourth option (option 4-2). In FIG. 7, the PDCCH 727 and EPDCCH 729 are indicated by shaded rectangles. Each arrow is a linkage 735 from that PDCCH 727 or EPDCCH 729 to a DL-TX 733 of which presence is indicated by a dynamic indication. The first subframe of the LAA 725 burst may include a CCA 731 subframe.

In the fourth option, the LAA subframe indication (e.g., dynamic indication) is carried on a PDCCH 727 or an EPDCCH 729 in a USS. The USS may be used for an allocation of the PDSCH that contains UE-specific packet data. In option 4-2 the dynamic indication is on the LAA SCell 725.

As described above, the USS for the dynamic indication may be defined using the same C-RNTI as in a PDSCH allocation. Alternatively, the USS for the dynamic indication may be defined using a specific RNTI (e.g. LAA-RNTI) that may be configured independently of C-RNTI. Also, PDCCH 727 or EPDCCH 729 on the USS may be masked by using the specific RNTI in this instance. Similarly to Options 1-3 described above, only the EPDCCH 729 on the LAA SCell 725 is available for carrying the indication in the CCA 731 subframe while any PDCCH 727 or EPDCCH 729 can carry the indication in other subframes within the burst. It should be noted that in option 4-2, the dynamic indication is not on the PCell 723.

Figure 8:
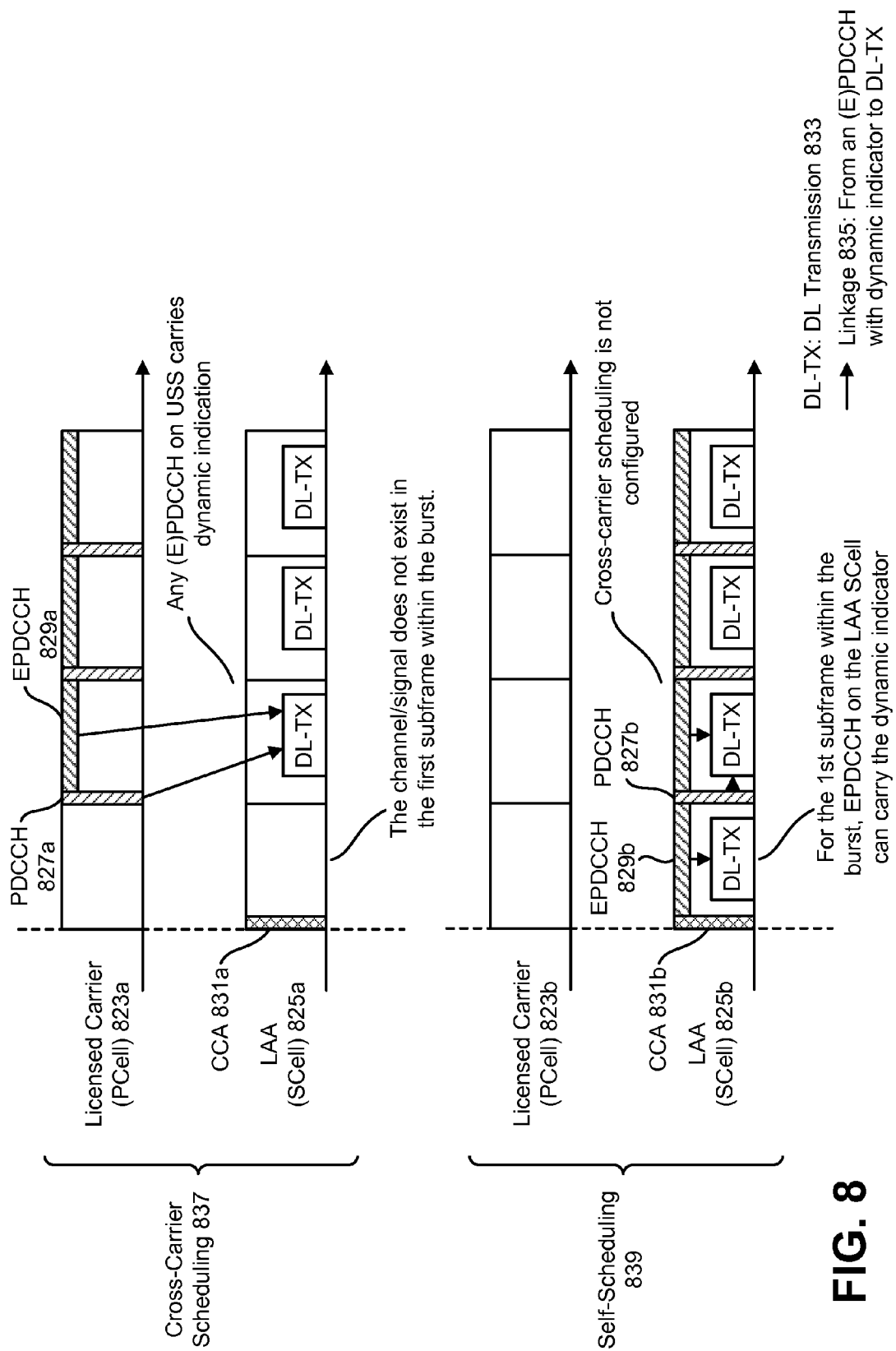
FIG. 8 illustrates examples of cross-carrier scheduling and self-scheduling for a PDSCH assignment.

FIG. 8 illustrates examples of cross-carrier scheduling 837 and self-scheduling 839 for a PDSCH assignment. In FIG. 8, the PDCCH 827 and EPDCCH 829 are indicated by shaded rectangles. Each arrow is a linkage 835 from that PDCCH 827 or EPDCCH 829 to a DL-TX 833 of which presence is indicated by a dynamic indication. The first subframe of the LAA 825 burst may include a CCA 831 subframe.

As described above, there may be two approaches for the PDCCH 827 or EPDCCH 829 carrying a DL grant for LAA PDSCH. In a first approach, cross-carrier scheduling 823 is performed. In cross-carrier scheduling 823, a detection of an PDCCH 827a or EPDCCH 829a on a PCell 823a (e.g., licensed carrier) indicates a PDSCH transmission on a SCell 825a (e.g., LAA carrier).

In a second approach, self-scheduling 839 is performed. Self-scheduling 839 may also be referred to as non-cross-carrier scheduling. In self-scheduling 839, a detection of a PDCCH 827b or EPDCCH 829b on a SCell 825b (e.g., LAA carrier) indicates a PDSCH transmission on the SCell 825b (LAA carrier). It should be noted that in self-scheduling 839, the dynamic indication is not on the PCell 823b.

As in the above cases for the dynamic indication of the presence of a signal/channel, in self-scheduling 839 only the EPDCCH 829b on the LAA SCell 825b is available for carrying the PDSCH assignment (e.g., DL grant) in the CCA 831b subframe. Furthermore, any PDCCH 827 or EPDCCH 829 can carry the PDSCH assignment in other subframes within the burst regardless of whether cross-carrier scheduling is configured or not.

For self-scheduling 839, the indication is on a PDCCH 827b or EPDCCH 829b of a licensed scheduling cell. If the CCA 831b is carried in the leading OFDM symbols of a subframe, the indication may not be present in the first LAA 825b subframe, and may be included in all continuous subframes in a LAA 825b subframe burst. If the CCA 831b is carried in the OFDM symbols of a previous subframe, the indication may be present in every subframe in a LAA 825b subframe burst.

Any combinations of self-scheduling 839, cross-carrier scheduling 837 and option 1, 2, 3, 4-1 and 4-2 can be applied. In a first example, if cross-carrier scheduling 837 is configured for the LAA SCell 825 and its scheduling serving cell is the PCell 823 (e.g., the licensed carrier), then the PDCCH 827 or EPDCCH 829 for the dynamic indication may be transmitted/monitored in the PCell 823 (e.g., option 1 or option 4-1). If the cross-carrier scheduling 837 is not configured, then the PDCCH 827 or EPDCCH 829 for the dynamic indication may be transmitted/monitored in the SCell 825 (e.g., option 2, option 3 or option 4-2).

In a second example, the PDCCH 827 or EPDCCH 829 for the dynamic indication may be transmitted/monitored in the PCell 823 (e.g., option 1 or option 4-1) regardless of whether or not the cross-carrier scheduling 837 is configured.

In a third example, the PDCCH 827 or EPDCCH 829 for the dynamic presence indication may be transmitted/monitored in the SCell 825 (e.g., option 2, option 3 or option 4-2) regardless of whether or not cross-carrier scheduling 837 is configured.

In a fourth example, if the cross-carrier scheduling 837 is not configured, then the PDCCH 827 or EPDCCH 829 for the dynamic indication may be transmitted/monitored in the SCell 825 (e.g., option 2, option 3 or option 4-2). If the cross-carrier scheduling 837 is configured for the LAA SCell 825 and its scheduling serving cell is another SCell 825, then the PDCCH 827 or EPDCCH 829 for the dynamic indication may be transmitted/monitored in the PCell 823 (e.g., option 1 or option 4-1).

Figure 9:
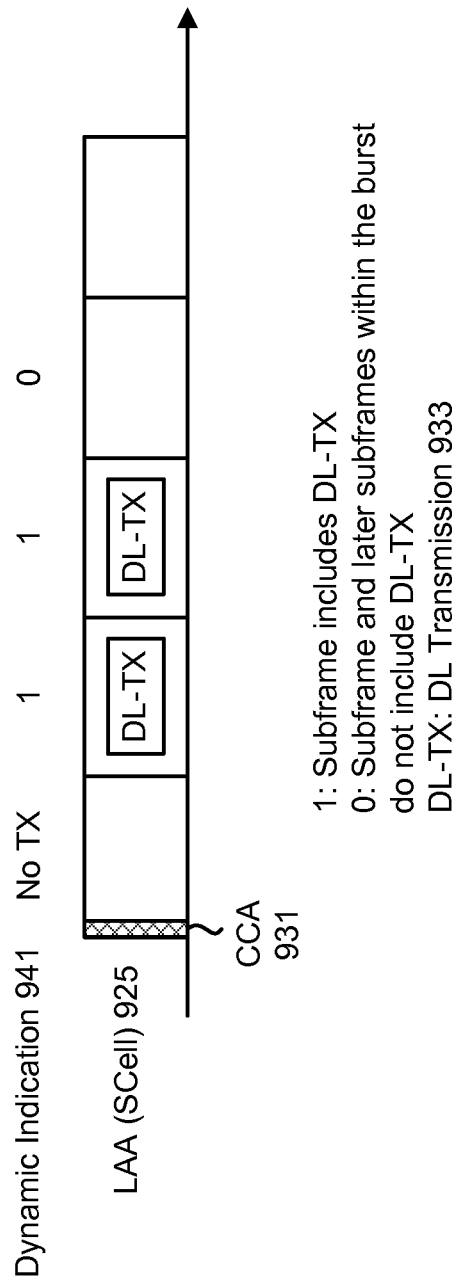
FIG. 9 shows an example of a PDCCH carrying 2-state information.

FIG. 9 shows an example of a PDCCH carrying 2-state information. A dynamic indication 941 may be an (E)PDCCH. In this example, five subframes of an LAA (SCell) 925 burst are shown.

In this example, a 1-bit field may express 2 states. One state may mean that the subframe in which the (E)PDCCH is transmitted/detected includes a DL transmission (DL-TX) 933 on the LAA (SCell) 925. The other state may mean that the subframe and later subframe(s) within the burst does not include any DL transmission 933.

In one configuration, in a case where the eNB 160 transmits any signals/channels in a given subframe, the eNB 160 may transmit, in the subframe, the (E)PDCCH with the DCI format in which the field indicates the value is "1". In the case where the eNB 160 did transmit any signals/channels just before a given subframe but does not transmit any signals/channels in the subframe, the eNB 160 may transmit, in the subframe, the (E)PDCCH with the DCI format in which the field indicates the value is "0". Alternatively, in the case where the eNB 160 does not transmit any signals/channels in a given subframe, the eNB 160 may transmit, in the subframe, the (E)PDCCH with the DCI format in which the field indicates the value is "0".

In FIG. 9, it is assumed that (E)PDCCH carrying the dynamic indication 941 is not transmitted or monitored in the CCA 931 subframe (as in option 1, 2 and 4-1). However, use cases should not be limited to this assumption. For instance, option 3 and option 4-2 may allow the eNB 160 to transmit and the UE 102 to monitor the (E)PDCCH carrying the dynamic indication 941 in the CCA 931 subframe.

Figure 10:
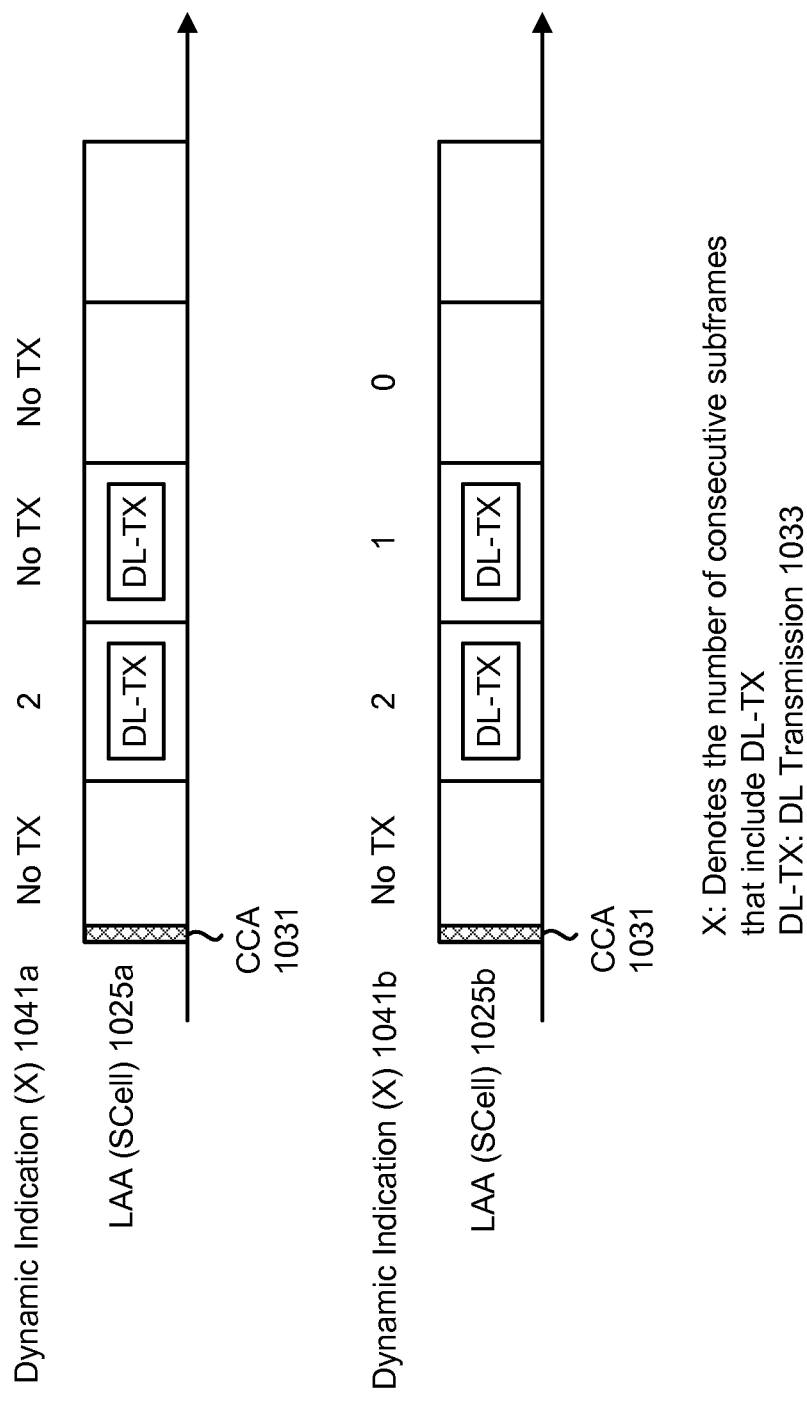
FIG. 10 shows examples of a (E)PDCCH that may express at least X states.

FIG. 10 shows examples of a (E)PDCCH that may express at least X states. A dynamic indication 1041a, 1041b may be an (E)PDCCH. In these examples, five subframes of an LAA (SCell) 1025a, 1025b burst are shown.

The field in the (E)PDCCH may express at least X states, where X is a natural number (e.g., a positive integer). In FIG. 10, it is assumed that (E)PDCCH carrying the dynamic indication 1041 is not transmitted or monitored in the CCA 1031. However, use cases should not be limited to this assumption.

In a first example, X may denote the number of consecutive subframes, in which the DL signal/channel (DL-TX 1033) is to be transmitted, in the LAA 1025a burst. In this instance, the eNB 160 may transmit only one dynamic indication for the burst, as illustrated by the upper example.

Alternatively, as shown in the lower example, X may denote the number of remaining consecutive subframes in the LAA 1025b burst in which the DL signal/channel (DL-TX 1033) is to be transmitted. It should be noted that X may not always equal $2^M$, where the field consists of M bits. If X is less than $2^M$, the remaining states can be reserved for another usage.

Figure 11:
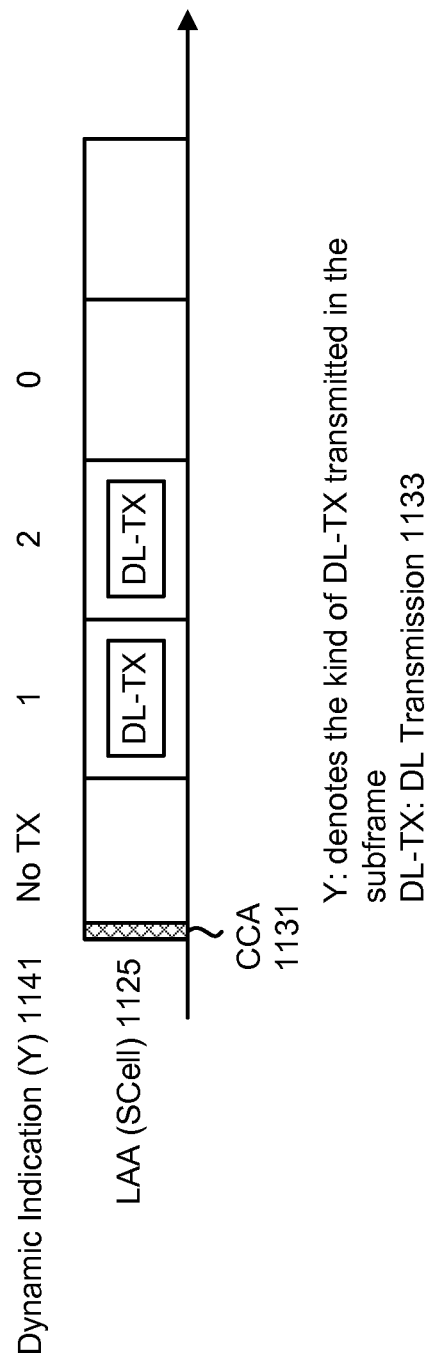
FIG. 11 shows an example of a (E)PDCCH that may express at least Y states.

FIG. 11 shows an example of a (E)PDCCH that may express at least Y states. A dynamic indication 1141 may be an (E)PDCCH. In this example, five subframes of an LAA (SCell) 1125 burst are shown.

This figure shows another example that the field may express at least Y states, where Y is a natural number (e.g., a positive integer). Y may denote the kind of DL signal/channel (DL-TX 1133) that is in the subframe of the LAA (SCell) 1125.

In one configuration, the first state may indicate that PSS/SSS is transmitted in the subframe and the second state may indicates that CSI-RS is transmitted. Similarly, the transmission of another signal/channel (e.g. CRS, discovery RS (DRS), positioning RS (PRS), PDSCH) may also be indicated.

In FIG. 11, it is assumed that (E)PDCCH carrying the dynamic indication 1141 is not transmitted or monitored in the CCA 1131. However, use cases should not be limited to this assumption.

Figure 12:
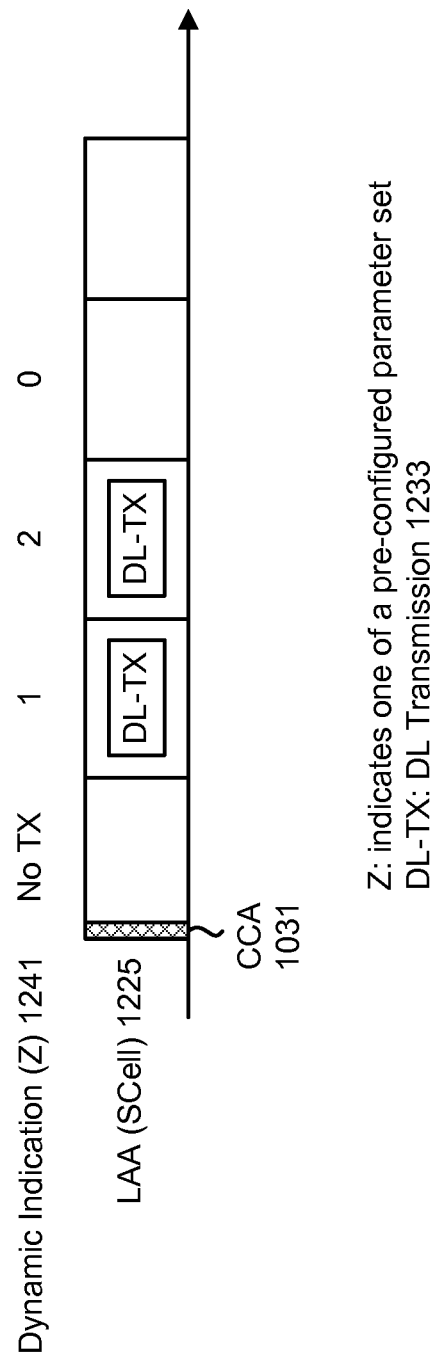
FIG. 12 shows an example of a (E)PDCCH that may express at least Z states.

FIG. 12 shows an example of a (E)PDCCH that may express at least Z states. A dynamic indication 1241 may be an (E)PDCCH. In this example, five subframes of an LAA (SCell) 1225 burst are shown.

This figure shows another example that the field may express at least Z states, where Z is a natural number (e.g., a positive integer). Z may indicate one of pre-configured parameter sets that denote parameters of the signal transmitted (DL-TX 1233) in the subframe of the LAA (SCell) 1225.

The parameters may include one of the kind of DL signal/channel (e.g. PSS, SSS, non-zero-power CSI-RS (NZP-CSI-RS), zero-power CSI-RS (ZP-CSI-RS), CRS, DRS, PRS), a reference signal sequence index, physical cell identity (PCI), a port (transmission port) index, the number of ports and Quasi-Co-Location (QCL) assumption.

In one configuration, the eNB 160 may configure the first set and the second set. The first set may include a parameter specifying NZP-CSI-RS and a parameter specifying the CSI-RS sequence. The second set may include a parameter specifying ZP-CSI-RS and a port index specifying the location of the ZP-CSI-RS.

The eNB 160 may transmit the first (E)PDCCH indicating the first set in the first subframe. The eNB 160 may transmit the second (E)PDCCH indicating the second set in the second subframe. The UE 102 that detects the first (E)PDCCH in the first subframe may use the NZP-CSI-RS in the first subframe for CSI measurement. The UE 102 that detects the second (E)PDCCH in the second subframe may skip the ZP-CSI-RS in a PDSCH demapping process. In contrast, the UE 102 may assume that if the parameter set does not include a parameter of a given signal, the signal does not exist in the subframe.

Figure 13:
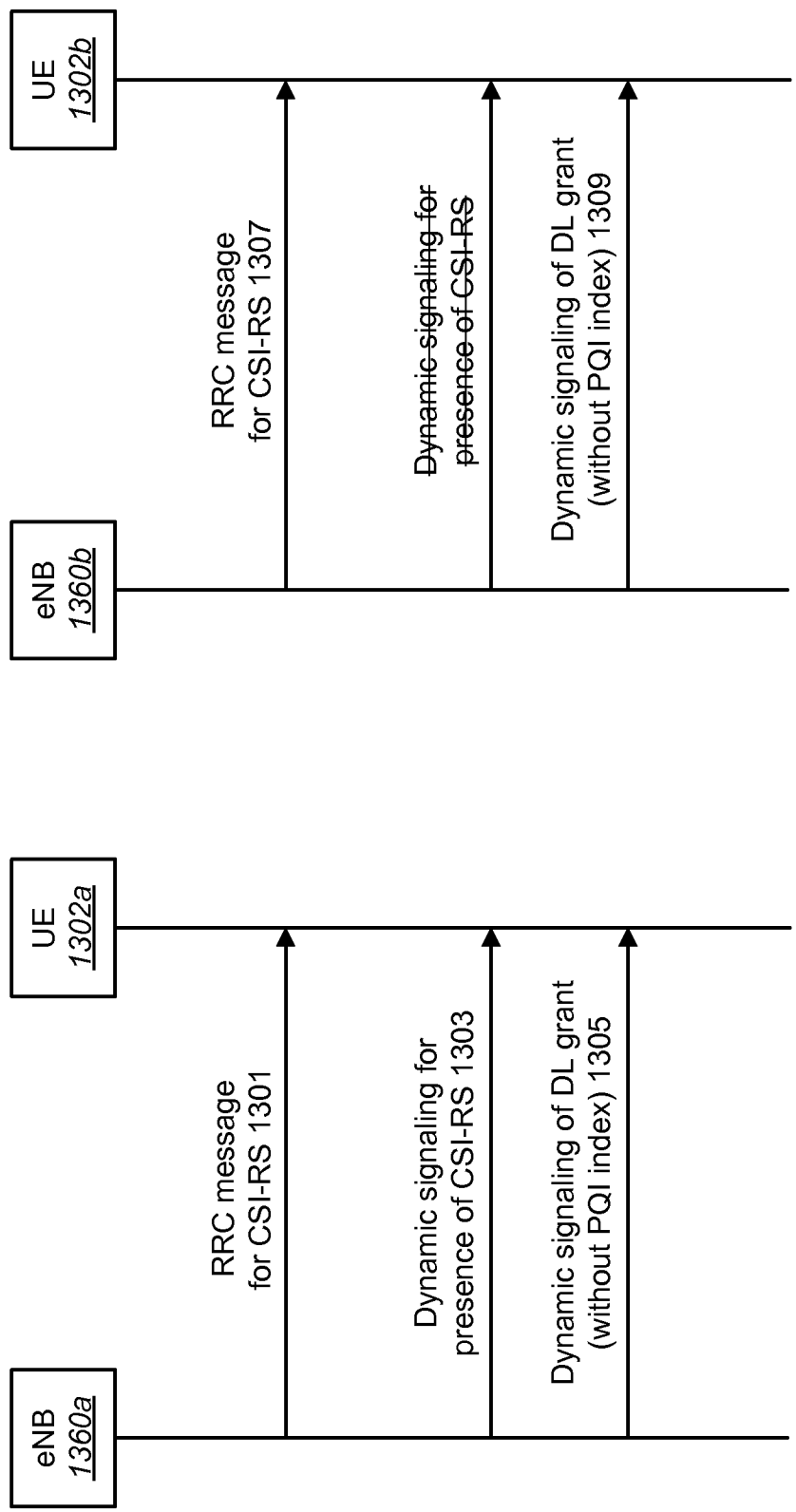
FIG. 13 is a sequence diagram illustrating a configuration of rate-matching by an eNB and a UE.

FIG. 13 is a sequence diagram illustrating two configurations of rate-matching by an eNB 1360 and a UE 1302. In a first configuration, the eNB 1360a may send 1301 an RRC message for a CSI-RS configuration to the UE 1302a. The eNB 1360a may send 1303 a dynamic signaling for the presence of the CSI-RS. The eNB 1360a may also send 1305 a dynamic signaling of a DL grant. This dynamic signaling may be sent 1305 without a PQI index.

In a second configuration, the eNB 1360b may send 1307 an RRC message for a CSI-RS configuration to the UE 1302b. The eNB 1360a may also send 1309 a dynamic signaling of a DL grant. This dynamic signaling may be sent 1309 without a PQI index. If the UE 1302b is not configured to monitor a dynamic signaling for the presence of CSI-RS, the UE 1302b may assume that CSI-RS based on the CSI-RS configuration is always transmitted. In this case, the UE 1302b performs rate-matching for all of the configured CSI-RS.

If the UE 1302 is configured to monitor a dynamic signaling for the presence of CSI-RS, there are several schemes that may be employed. In a first scheme, if the UE 1302 does not detect the dynamic signaling for a given subframe, the UE 1302 may perform rate-matching for the CSI-RS in the subframe and the UE 1302 does not use the CSI-RS in the subframe for CSI measurement. In this first scheme, although the detection of the dynamic signaling may affect the CSI measurement, rate-matching is always based on the CSI-RS configuration so that the complexity of the rate-matching process is alleviated. In addition, any of the CSI measurement can be done by using the CSI-RS that is actually transmitted. Therefore, the eNB 1360 can fully utilize the reported CSI.

In a second scheme, if the UE 1302 detects the dynamic signaling for a given subframe, the UE 1302 does not perform rate-matching for the CSI-RS in the subframe. The UE 1302 may use the CSI-RS in the subframe for CSI measurement. If the UE 1302 does not detect the dynamic signaling for a given subframe, the UE 1302 does not perform rate-matching for the CSI-RS in the subframe and the UE 1302 does not use the CSI-RS in the subframe for CSI measurement. Similarly to the first scheme, although the detection of the dynamic signaling may affect the CSI measurement, rate-matching is always based on the CSI-RS configuration so that the complexity of the rate-matching process is alleviated. In addition, any of the CSI measurement can be done by using the CSI-RS that is actually transmitted. Therefore, the eNB 1360 can fully utilize the reported CSI.

In a third scheme, if the UE 1302 detects the dynamic signaling for a given subframe, the UE 1302 performs rate-matching for the CSI-RS in the subframe and the UE 1302 may use the CSI-RS in the subframe for CSI measurement. If the UE 1302 does not detect the dynamic signaling for a given subframe, the UE 1302 does not perform rate-matching for the CSI-RS in the subframe and the UE 1302 does not use the CSI-RS in the subframe for CSI measurement. In this third scheme, the detection of the dynamic signaling may affect both the CSI measurement and the rate-matching. This provides functionality to apply a suitable rate-matching pattern with respect to each subframe. In addition, any of the CSI measurement can be done by using the CSI-RS that is actually transmitted. Therefore, the eNB 1360 can fully utilize the reported CSI.

Figure 14:
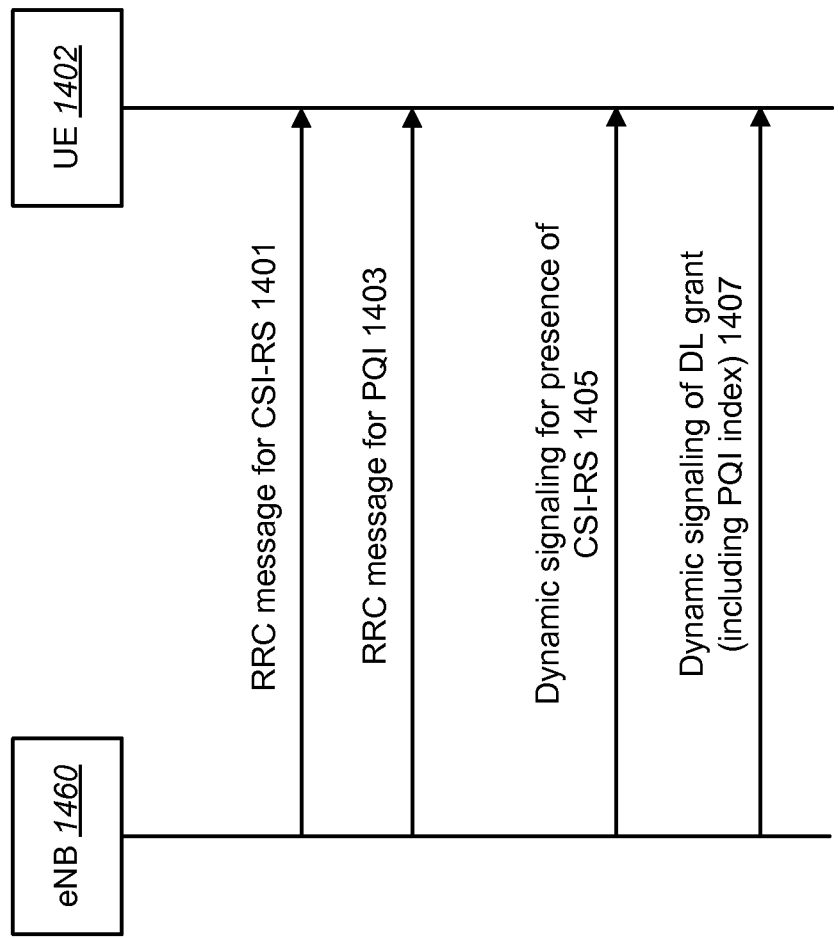
FIG. 14 is a sequence diagram illustrating another configuration of rate-matching by an eNB and a UE.

FIG. 14 is a sequence diagram illustrating another configuration of rate-matching by an eNB 1460 and a UE 1402. The eNB 1460 may send 1401 an RRC message for CSI-RS to the UE 1402. The eNB 1460 may send 1403 an RRC message for PQI to the UE 1402. The eNB 1460 may send 1405 dynamic signaling for the presence of CSI-RS. The eNB 1460 may also send 1407 dynamic signaling of a DL grant that includes a PQI index.

In some modes (e.g., transmission mode 10), an eNB 1460 may configure at most 4 PDSCH RE Mapping and Quasi-Co-Location Indicator (PQI) parameter sets by higher layer signaling. One of the configured parameter sets may be indicated by a PQI field in a DCI format.

Each of the parameter sets may include at least one of the number of CRS ports, CRS frequency shift, MBSFN subframe configuration, ZP-CSI-RS configuration, PDSCH starting symbol and QCLed NZP-CSI-RS index. The parameter sets may be used for identifying a PDSCH resource mapping pattern of the subframe in which the (E)PDCCH with the DCI is detected. In this case, the rate-matching may follow the indicated PQI parameter set regardless of whether or not the dynamic signaling for the presence of a signal such as CSI-RS is detected in the subframe.

Figure 15:
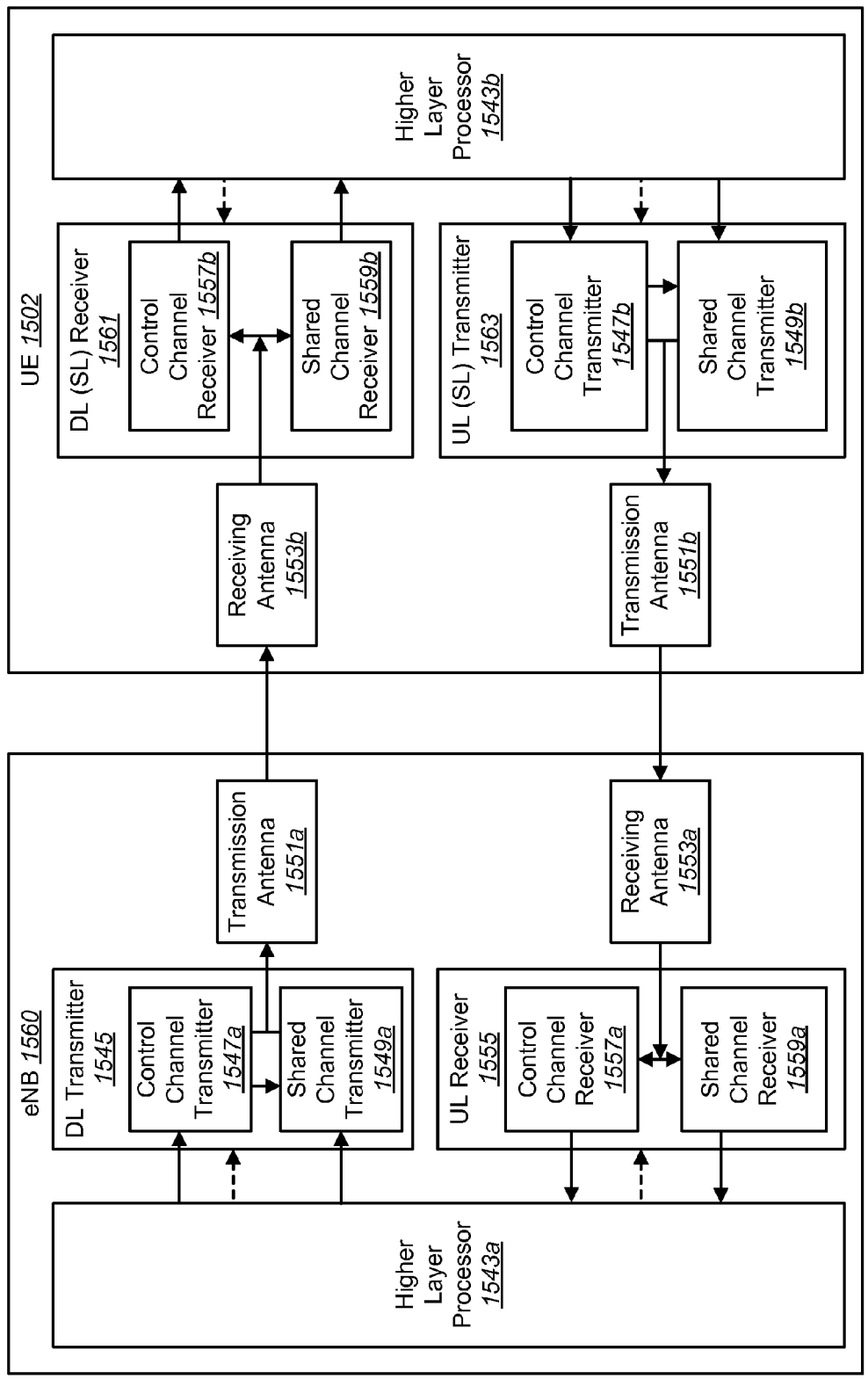
FIG. 15 is block diagram illustrating a detailed configuration of an eNB and a UE in which systems and methods for LAA may be implemented.

FIG. 15 is block diagram illustrating a detailed configuration of an eNB 1560 and a UE 1502 in which systems and methods for LAA may be implemented. The eNB 1560 may include a higher layer processor 1543*a* a DL transmitter 1545 and a UL receiver 1555. The higher layer processor 1543*a* may communicate with the DL transmitter 1545, UL receiver 1555 and subsystems of each.

The DL transmitter 1545 may include a control channel transmitter 1547*a* and a shared channel transmitter 1549*a*. The DL transmitter 1545 may transmit signals/channels to the UE 1502 using a transmission antenna 1551*a*. The UL receiver 1555 may include a control channel receiver 1557*a* and a shared channel receiver 1559*a*. The UL receiver 1555 may receive signals/channels from the UE 1502 using a receiving antenna 1553*a*.

The higher layer processor 1543*a* may be configured to transmit a radio resource control (RRC) message to specify subframes for a channel state information-reference signal (CSI-RS). The control channel transmitter 1547*a* may be configured to transmit a first control channel and a second control channel in a subframe. The first control channel may indicate whether the CSI-RS in the subframe is available for CSI measurement. The second control channel may be a control channel of which detection indicates a transmission of a shared channel in the subframe. The shared channel transmitter 1549*a* may be configured to transmit the shared channel when the second control channel is transmitted.

The higher layer processor 1543*a* may be further configured to transmit a RRC message to specify a first serving cell as a scheduling cell for a second serving cell. The second serving cell may be a serving cell on which the shared channel is transmitted. The control channel transmitter 1547*a* may be configured, upon a configuration of the first serving cell, to transmit the first control channel on the second serving cell and to transmit the second control channel on the first serving cell.

If a cross carrier scheduling is not configured for a serving cell on which the shared channel is transmitted, the control channel transmitter 1547*a* may be configured to transmit the first control channel and the second control channel on the serving cell.

The first control channel may further indicate the number of remaining consecutive subframes in a burst in which the subframe is included.

The UE 1502 may include a higher layer processor 1543*b*, a DL (SL) receiver 1561 and a UL (SL) transmitter 1563. The higher layer processor 1543*b* may communicate with the DL (SL) receiver 1561, UL (SL) transmitter 1563 and subsystems of each.

The DL (SL) receiver 1561 may include a control channel receiver 1557*b* and a shared channel receiver 1559*b*. The DL (SL) receiver 1661 may receive signals/channels from the eNB 1560 using a receiving antenna 1553*b*. The UL (SL) transmitter 1563 may include a control channel transmitter 1547*b* and a shared channel transmitter 1549*b*. The UL (SL) transmitter 1563 may send signals/channels to the eNB 1560 using a transmission antenna 1551*b*.

The higher layer processor 1543*b* may be configured to receive a radio resource control (RRC) message to specify subframes for a channel state information-reference signal (CSI-RS).

The control channel receiver 1557*b* may be configured to monitor a first control channel and a second control channel in a subframe. The first control channel may indicate whether the CSI-RS in the subframe is available for CSI measurement. The second control channel may be a control channel of which detection indicates a transmission of a shared channel in the subframe. The shared channel receiver 1559b may be configured to receive the shared channel when the second control channel is detected.

Figure 16:
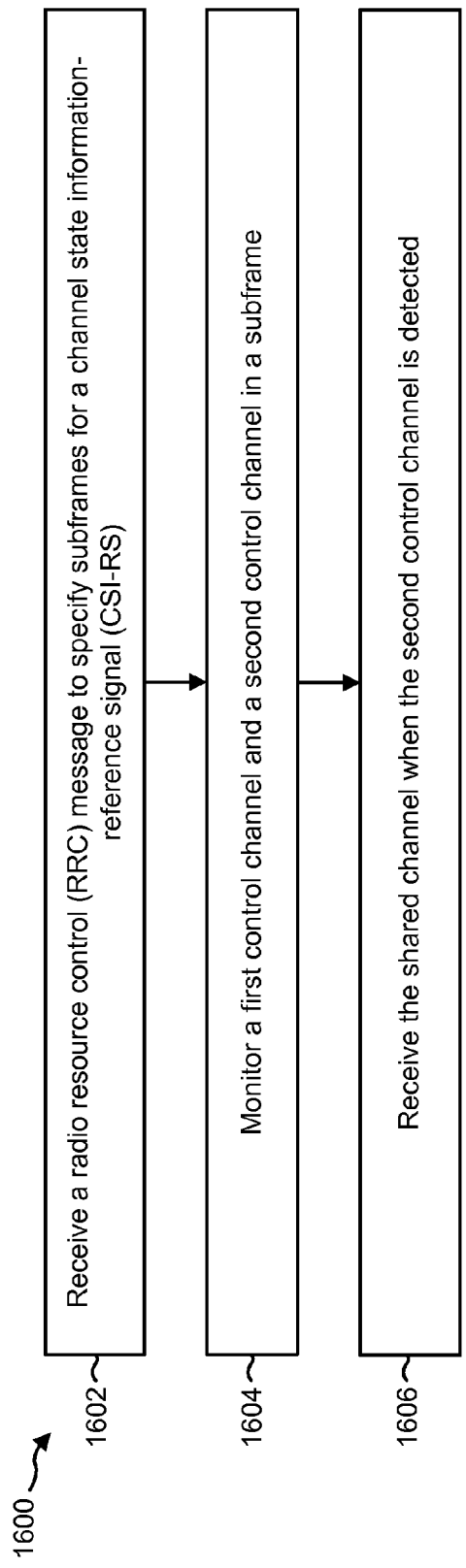
FIG. 16 is a flow diagram illustrating one implementation of a method for LAA by a UE.

FIG. 16 is a flow diagram illustrating one implementation of a method 1600 for licensed assisted access (LAA) by a UE 102. The method 1600 may be implemented by a UE 102. The UE 102 may communicate with one or more eNBs 160 in a wireless communication network. In one implementation, the wireless communication network may include an LTE network.

The UE 102 may receive 1602 a radio resource control (RRC) message to specify subframes for a channel state information-reference signal (CSI-RS).

The UE 102 may monitor 1604 a first control channel and a second control channel in a subframe. The first and second control channel may be one of a PDCCH or EPDCCH. The first control channel may indicate whether the CSI-RS in the subframe is available for CSI measurement. The second control channel may be a control channel of which detection indicates a transmission of a shared channel (e.g., PDSCH) in the subframe.

The UE 102 may receive 1606 the shared channel when the second control channel is detected.

Figure 17:
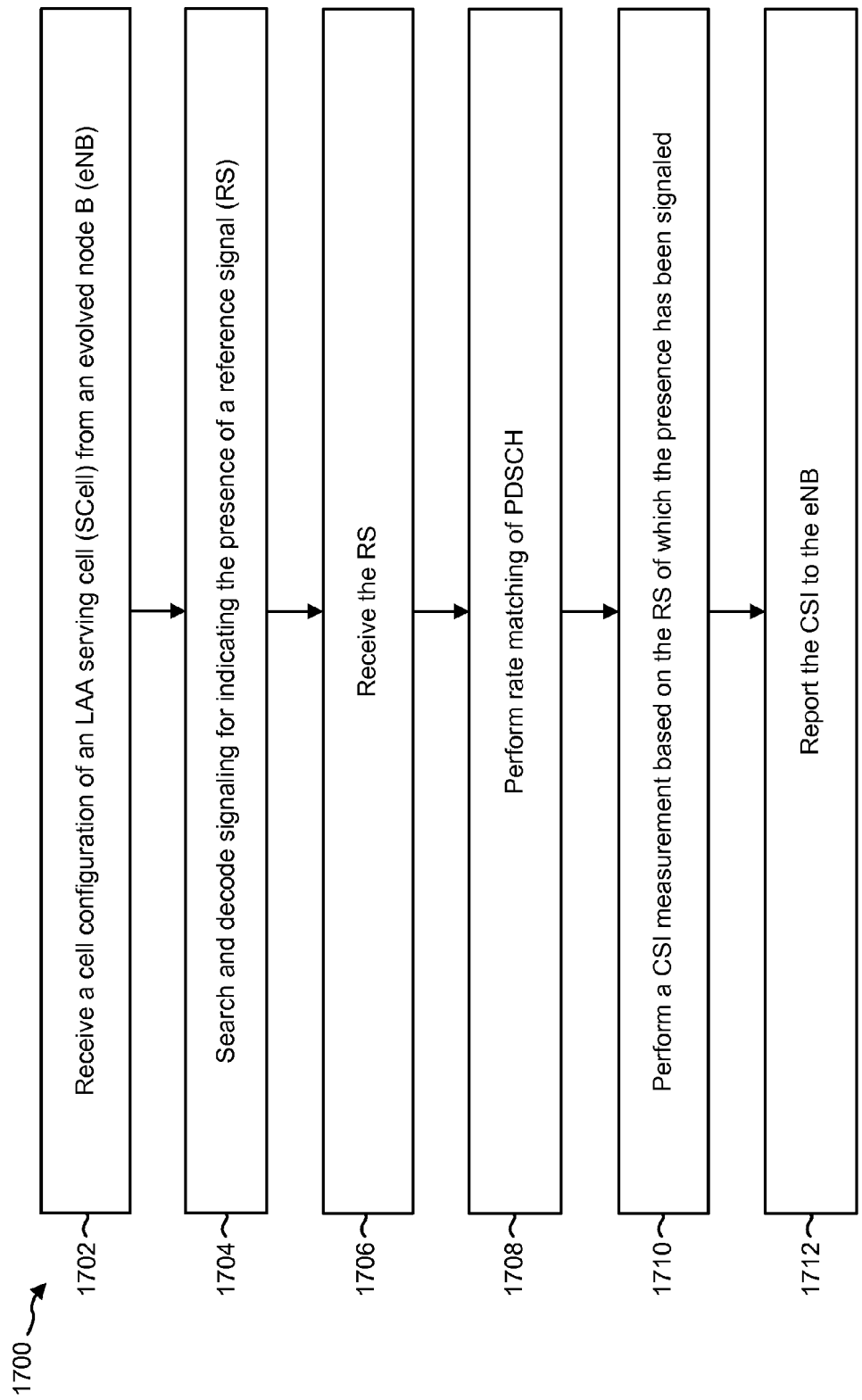
FIG. 17 is a flow diagram illustrating another implementation of a method for LAA by a UE.

FIG. 17 is a flow diagram illustrating another implementation of a method 1700 for licensed assisted access (LAA) by a UE 102. The method 1700 may be implemented by a UE 102. The UE 102 may communicate with one or more eNBs 160 in a wireless communication network. In one implementation, the wireless communication network may include an LTE network.

The UE 102 may receive 1702 a cell configuration of an LAA serving cell from an eNB 160. For a secondary serving cell (SCell), the cell configuration may be provided by the primary cell (PCell) radio resource control (RRC) configuration. The UE 102 may not be required to monitor the physical broadcast channel (PBCH) on a secondary cell (SCell). However, the PSS and SSS synchronization signals may be needed to perform time and frequency synchronization of the SCell. Therefore, the UE 102 may receive the cell configuration for the LAA serving cell that is a SCell from an eNB 160 on an LTE cell that is the PCell.

The UE 102 may search 1704 and decode signaling for indicating the presence of a reference signal (RS). The signaling may be a dynamic indication, as described above in connection with FIG. 1. The UE 102 may receive 1706 the RS upon detecting the dynamic indication.

The UE 102 may perform 1708 rate-matching of a PDSCH. This may be accomplished as described in connection with FIG. 1.

The UE 102 may perform 1710 a CSI measurement based on the RS dynamic indication. This may be accomplished as described in connection with FIG. 1. The UE 102 may report 1712 the CSI to the eNB 160.

Figure 18:
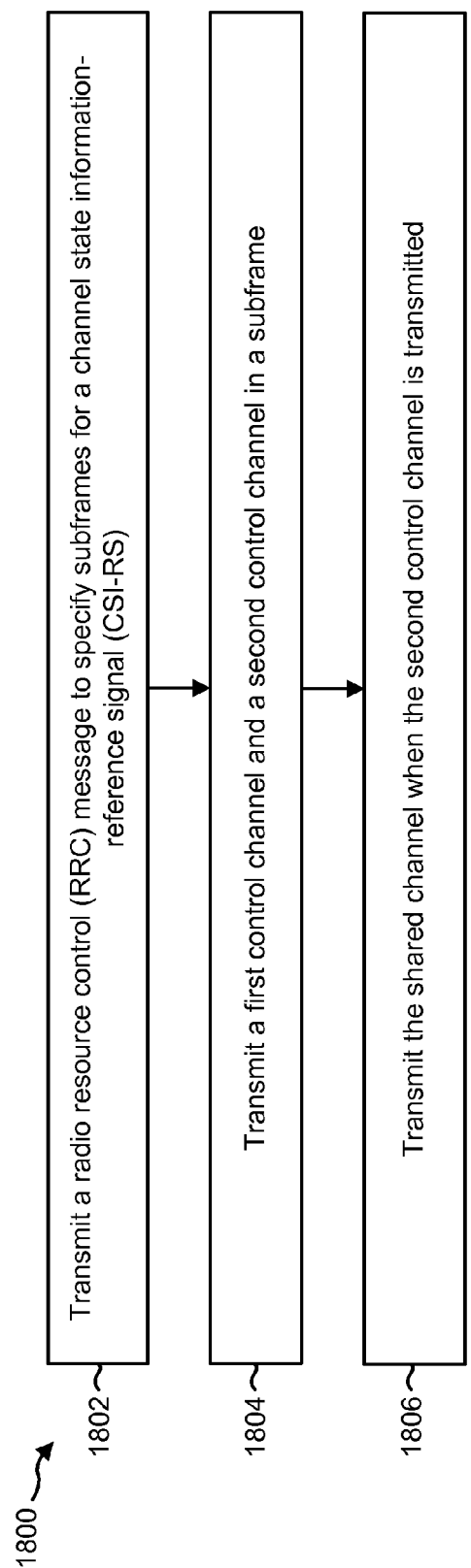
FIG. 18 is a flow diagram illustrating one implementation of a method for LAA by an eNB.

FIG. 18 is a flow diagram illustrating one implementation of a method 1800 for LAA by an eNB. The method 1800 may be implemented by an eNB 160. The eNB 160 may communicate with one or more UEs 102 in a wireless communication network. In one implementation, the wireless communication network may include an LTE network.

The eNB 160 may transmit 1802 a radio resource control (RRC) message to specify subframes for a channel state information-reference signal (CSI-RS).

The eNB 160 may transmit 1804 a first control channel and a second control channel in a subframe. The first control channel may indicate whether the CSI-RS in the subframe is available for CSI measurement. The second control channel may be a control channel of which detection indicates a transmission of a shared channel in the subframe.

The eNB 160 may transmit 1806 the shared channel when the second control channel is transmitted.

Figure 19:
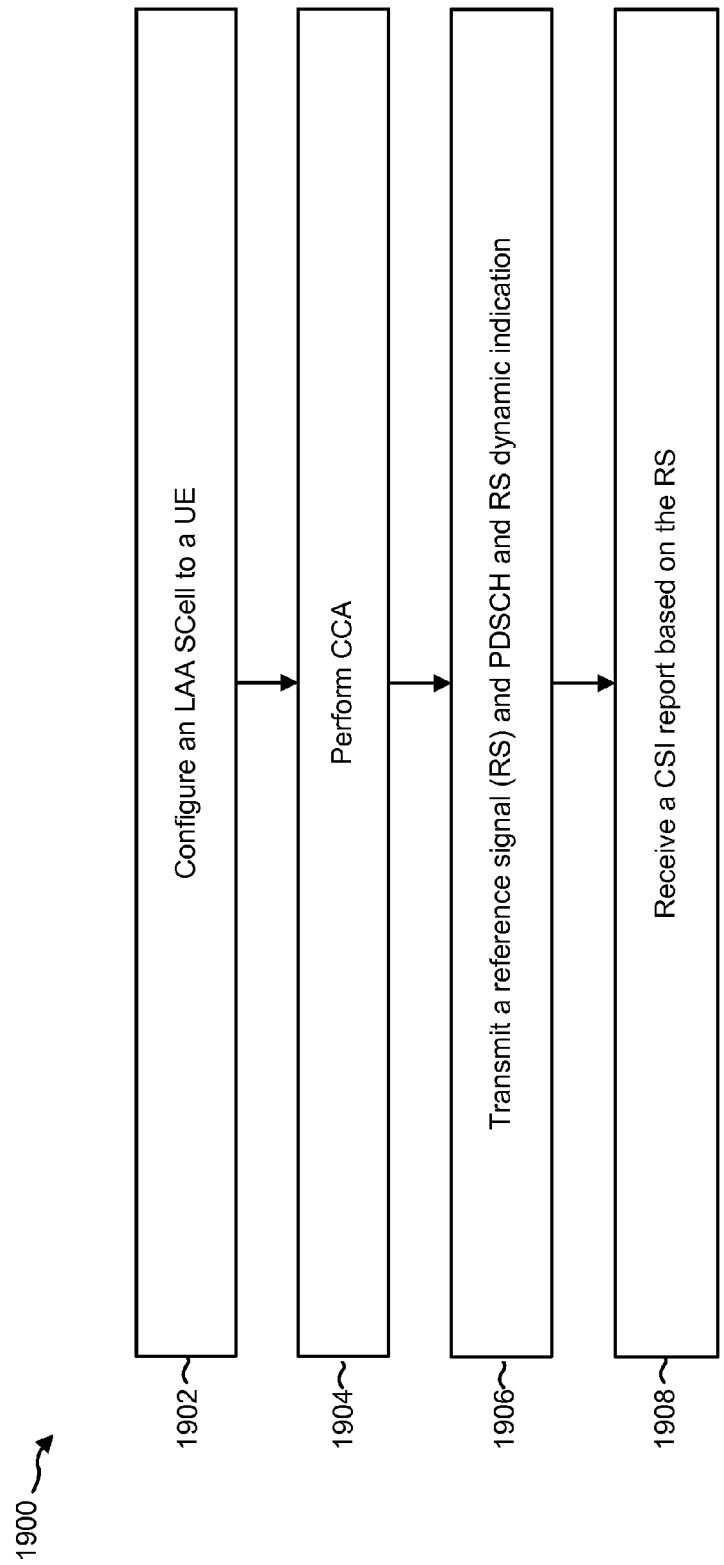
FIG. 19 is a flow diagram illustrating another implementation of a method for LAA by an eNB.

FIG. 19 is a flow diagram illustrating another implementation of a method 1900 for LAA by an eNB. The method 1900 may be implemented by an eNB 160. The eNB 160 may communicate with one or more UEs 102 in a wireless communication network. In one implementation, the wireless communication network may include an LTE network.

The eNB 160 may configure 1902 a LAA serving cell for one or more UEs 102. As described above, a LAA serving cell allows opportunistic usage of unlicensed carrier for LTE transmissions. The eNB 160 may transmit the cell configuration for the LAA serving cell on an LTE cell that is a PCell. The LAA serving cell may be a SCell.

The eNB 160 may perform 1904 CCA. The eNB 160 may perform 1904 CCA to ensure that the LAA channel is clear.

Upon determining that the LAA channel is clear, the eNB 160 may transmit 1906 a reference signal (RS) and PDSCH. The eNB 160 may also transmit a dynamic indication for the RS. This may be accomplished as described in connection with FIG. 1.

The eNB 160 may receive 1908 a CSI report based on the RS. This may be accomplished as described in connection with FIG. 1.

Figure 20:
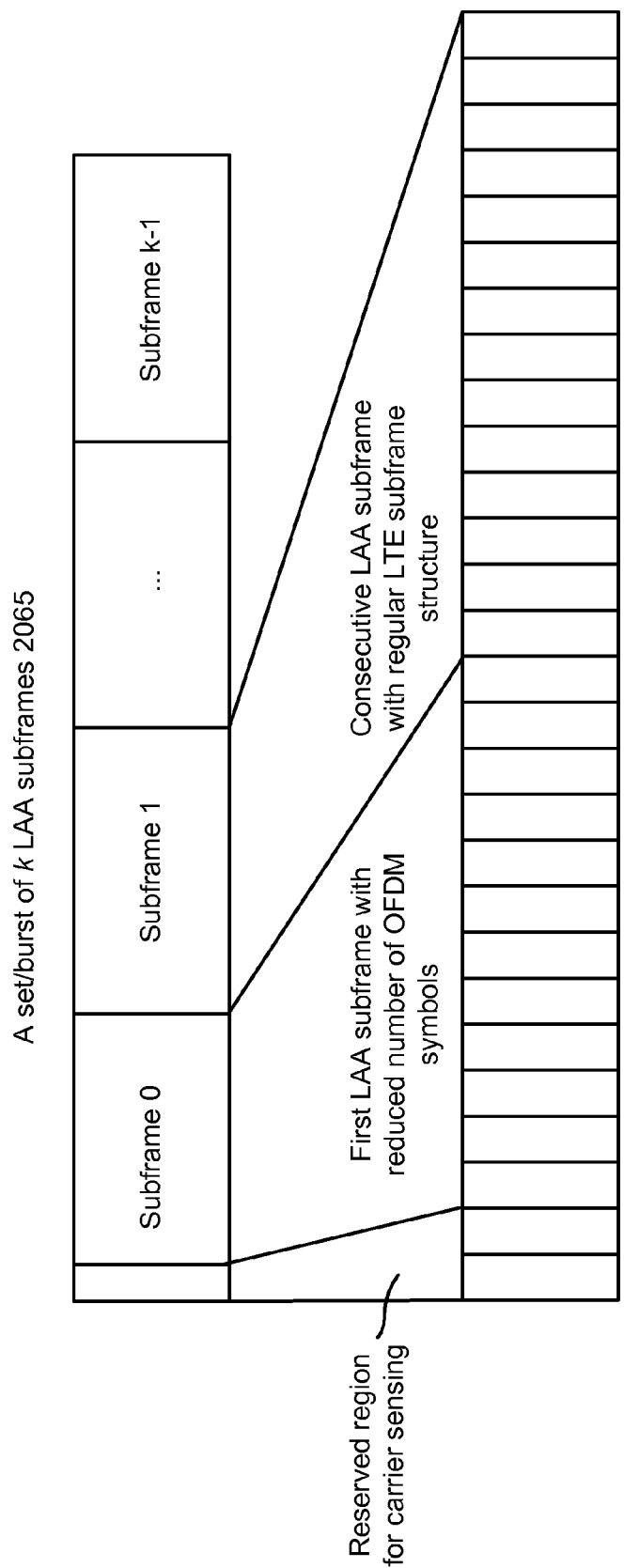
FIG. 20 illustrates an example of a LAA subframe burst transmission.

FIG. 20 illustrates an example of a LAA subframe burst transmission 2065. This transmission 2065 may also be referred to as a LAA subframe set transmission. To provide fairness to other networks on the same unlicensed carrier, the eNB 160 may configure a maximum number k of continuous subframe transmissions 2065 in a LAA cell (e.g., a set of LAA subframes or a burst of LAA subframes). The maximum transmission time in an unlicensed carrier may be different in different regions and/or countries based on the regulatory requirements.

In this example, the subframe is configured with normal cyclic prefix. The first two OFDM symbol length is reserved for carrier sensing. Thus, subframe 0 in a set of LAA subframes is a subframe with a reduced number of symbols. No sensing is necessary for continuous LAA subframe transmission after the first LAA subframe. The regular LTE subframe structure may be applied on consecutive subframes in a LAA subframe set.

It should be noted that the subframe index number in FIG. 20 refers to the index in a LAA subframe burst, instead of the subframe index in a radio frame as in legacy LTE cells.

Figure 21:
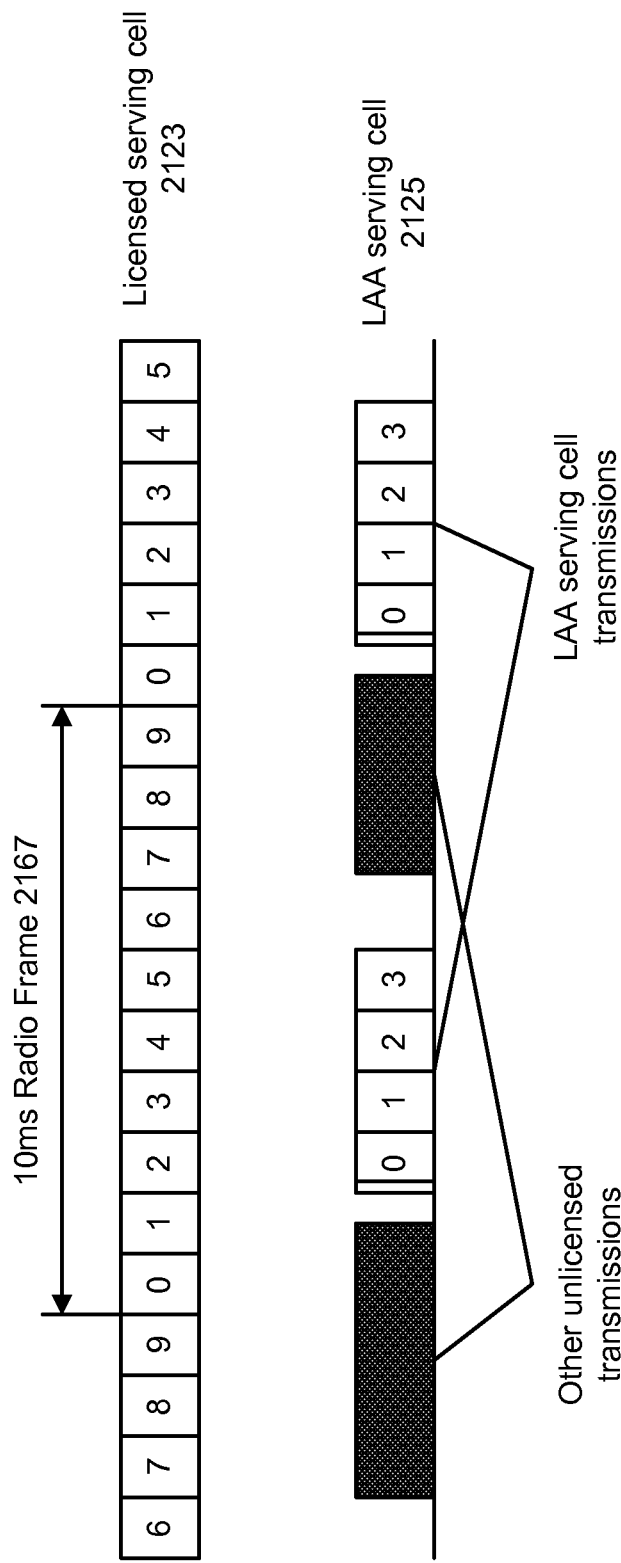
FIG. 21 illustrates an example of LAA coexistence with other unlicensed transmissions.

FIG. 21 illustrates an example of LAA coexistence with other unlicensed transmissions. A licensed serving cell 2123 is shown with a 10 ms radio frame 2167. A LAA serving cell 2125 has LAA serving cell transmissions and other unlicensed transmissions (e.g., Wi-Fi or other LAA cells). Due to carrier sensing and deferred transmissions, the starting of a LAA transmission may be any subframe index in the radio frame 2167 of the licensed frame structure.

Figure 22:
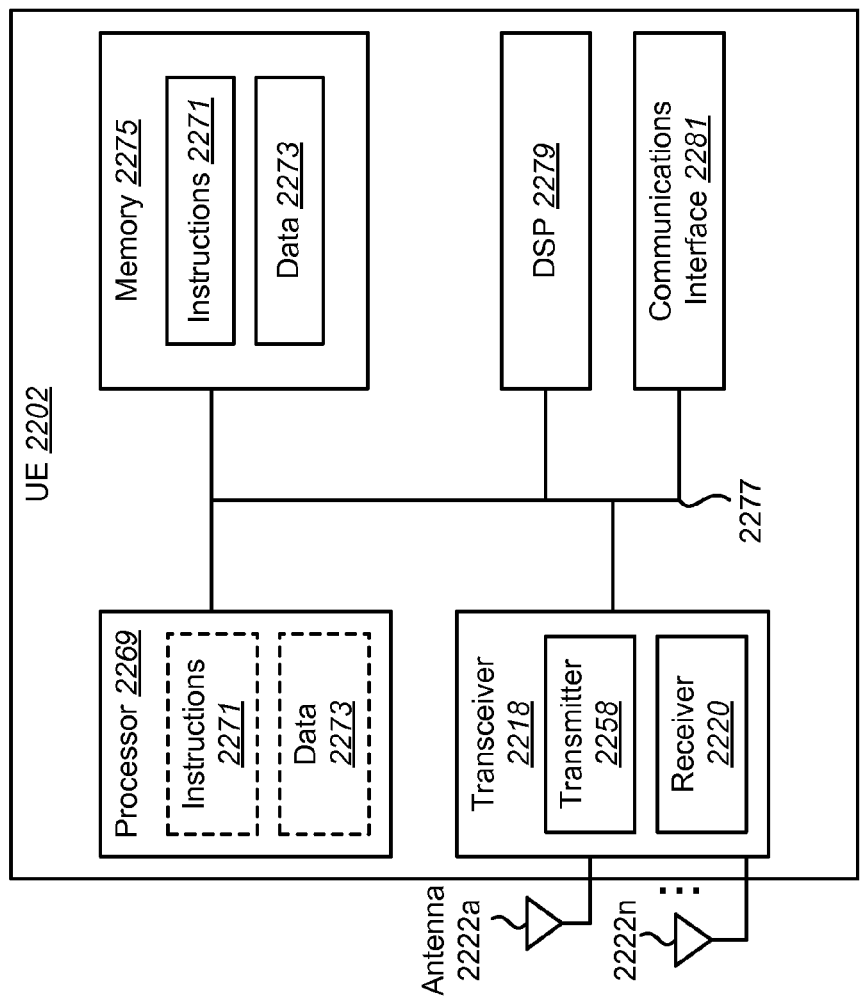
FIG. 22 illustrates various components that may be utilized in a UE.

FIG. 22 illustrates various components that may be utilized in a UE 2202. The UE 2202 described in connection with FIG. 22 may be implemented in accordance with the UE 102 described in connection with FIG. 1. The UE 2202 includes a processor 2269 that controls operation of the UE 2202. The processor 2269 may also be referred to as a central processing unit (CPU). Memory 2275, which may include read-only memory (ROM), random access memory (RAM), a combination of the two or any type of device that may store information, provides instructions 2271a and data 2273a to the processor 2269. A portion of the memory 2275 may also include non-volatile random access memory (NVRAM). Instructions 2271b and data 2273b may also reside in the processor 2269. Instructions 2271b and/or data 2273*b* loaded into the processor 2269 may also include instructions 2271*a* and/or data 2273*a* from memory 2275 that were loaded for execution or processing by the processor 2269. The instructions 2271*b* may be executed by the processor 2269 to implement one or more of the methods 1600 and 1700 described above.

The UE 2202 may also include a housing that contains one or more transmitters 2258 and one or more receivers 2220 to allow transmission and reception of data. The transmitter(s) 2258 and receiver(s) 2220 may be combined into one or more transceivers 2218. One or more antennas 2222*a*-*n* are attached to the housing and electrically coupled to the transceiver 2218.

The various components of the UE 2202 are coupled together by a bus system 2277, which may include a power bus, a control signal bus and a status signal bus, in addition to a data bus. However, for the sake of clarity, the various buses are illustrated in FIG. 22 as the bus system 2277. The UE 2202 may also include a digital signal processor (DSP) 2279 for use in processing signals. The UE 2202 may also include a communications interface 2281 that provides user access to the functions of the UE 2202. The UE 2202 illustrated in FIG. 22 is a functional block diagram rather than a listing of specific components.

Figure 23:
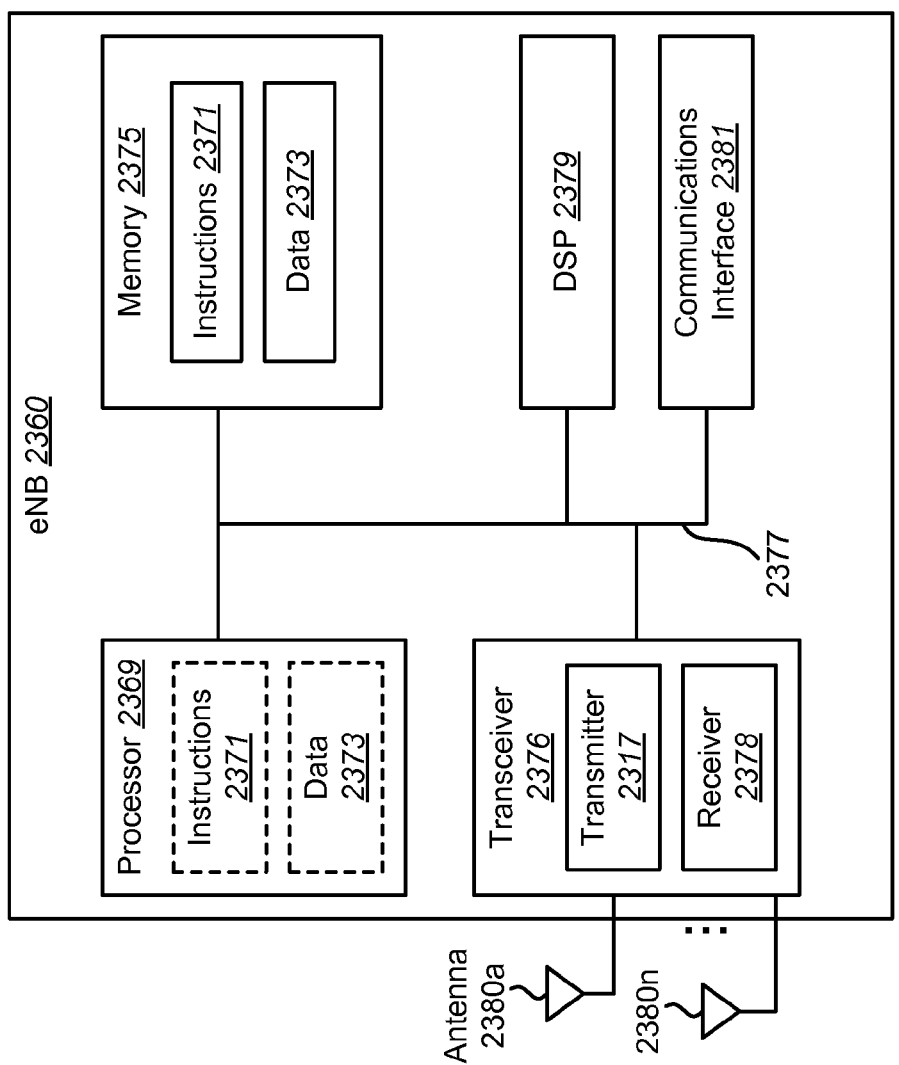
FIG. 23 illustrates various components that may be utilized in an eNB.

FIG. 23 illustrates various components that may be utilized in an eNB 2360. The eNB 2360 described in connection with FIG. 23 may be implemented in accordance with the eNB 160 described in connection with FIG. 1. The eNB 2360 includes a processor 2369 that controls operation of the eNB 2360. The processor 2369 may also be referred to as a central processing unit (CPU). Memory 2375, which may include read-only memory (ROM), random access memory (RAM), a combination of the two or any type of device that may store information, provides instructions 2371*a* and data 2373*a* to the processor 2369. A portion of the memory 2375 may also include non-volatile random access memory (NVRAM). Instructions 2371*b* and data 2373*b* may also reside in the processor 2369. Instructions 2371*b* and/or data 2373*b* loaded into the processor 2369 may also include instructions 2371*a* and/or data 2373*a* from memory 2375 that were loaded for execution or processing by the processor 2369. The instructions 2371*b* may be executed by the processor 2369 to implement one or more of the methods 1800 and 1900 described above.

The eNB 2360 may also include a housing that contains one or more transmitters 2317 and one or more receivers 2378 to allow transmission and reception of data. The transmitter(s) 2317 and receiver(s) 2378 may be combined into one or more transceivers 2376. One or more antennas 2380*a*-*n* are attached to the housing and electrically coupled to the transceiver 2376.

The various components of the eNB 2360 are coupled together by a bus system 2377, which may include a power bus, a control signal bus and a status signal bus, in addition to a data bus. However, for the sake of clarity, the various buses are illustrated in FIG. 23 as the bus system 2377. The eNB 2360 may also include a digital signal processor (DSP) 2379 for use in processing signals. The eNB 2360 may also include a communications interface 2381 that provides user access to the functions of the eNB 2360. The eNB 2360 illustrated in FIG. 23 is a functional block diagram rather than a listing of specific components.

Figure 24:
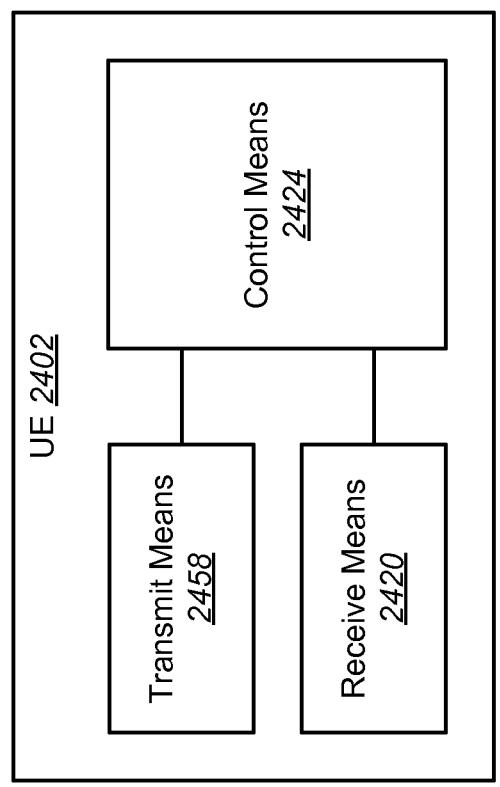
FIG. 24 is a block diagram illustrating one implementation of a UE in which systems and methods for performing LAA may be implemented.

FIG. 24 is a block diagram illustrating one implementation of a UE 2402 in which systems and methods for performing LAA may be implemented. The UE 2402 includes transmit means 2458, receive means 2420 and control means 2424. The transmit means 2458, receive means 2420 and control means 2424 may be configured to perform one or more of the functions described in connection with FIG. 24 above. FIG. 22 above illustrates one example of a concrete apparatus structure of FIG. 24. Other various structures may be implemented to realize one or more of the functions of FIG. 24. For example, a DSP may be realized by software.

Figure 25:
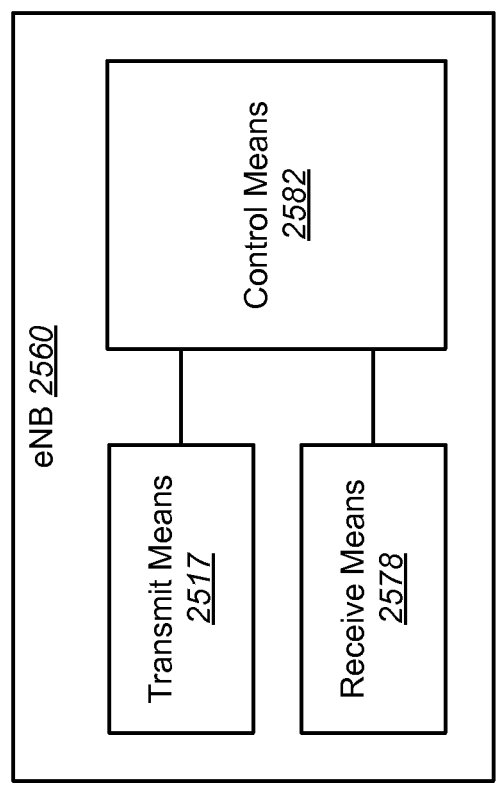
FIG. 25 is a block diagram illustrating one implementation of an eNB in which systems and methods for performing LAA may be implemented.

FIG. 25 is a block diagram illustrating one implementation of an eNB 2560 in which systems and methods for performing LAA may be implemented. The eNB 2560 includes transmit means 2517, receive means 2578 and control means 2582. The transmit means 2517, receive means 2578 and control means 2582 may be configured to perform one or more of the functions described in connection with FIG. 25 above. FIG. 23 above illustrates one example of a concrete apparatus structure of FIG. 25. Other various structures may be implemented to realize one or more of the functions of FIG. 25. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:
a higher layer processor configured to receive a radio resource control (RRC) message to specify subframes for a channel state information-reference signal (CSI-RS), wherein the higher layer processor is further configured to receive a RRC message to configure a first serving cell as a scheduling cell for a second serving cell, the second serving cell is a serving cell on which a shared channel is received;
a control channel receiver configured to monitor a first control channel and a second control channel in a subframe, the first control channel indicating whether the CSI-RS in the subframe is available for CSI measurement, the second control channel being a control channel of which detection indicates a transmission of the shared channel in the subframe, wherein the control channel receiver is further configured, based upon a configuration of the first serving cell, to monitor the first control channel on the second serving cell and to monitor the second control channel on the first serving cell; and
a shared channel receiver configured to receive the shared channel when the second control channel is detected.

2. The UE of claim 1, wherein
the control channel receiver is configured, if a cross carrier scheduling is not configured for a serving cell on which the shared channel is received, to monitor the first control channel and the second control channel on the serving cell.

3. The UE of claim 1, wherein
the first control channel further indicates the number of remaining consecutive subframes in a burst in which the subframe is included.

4. An evolved node B (eNB), comprising:
a higher layer processor configured to transmit a radio resource control (RRC) message to specify subframes for a channel state information-reference signal (CSI-RS), wherein the higher layer processor is further configured to transmit a RRC message to specify a first serving cell as a scheduling cell for a second serving cell, the second serving cell is a serving cell on which a shared channel is transmitted;
a control channel transmitter configured to transmit a first control channel and a second control channel in a subframe, the first control channel indicating whether the CSI-RS in the subframe is available for CSI measurement, the second control channel being a control channel of which detection indicates a transmission of the shared channel in the subframe, wherein the control channel transmitter is further configured, based upon a configuration of the first serving cell, to transmit the first control channel on the second serving cell and to transmit the second control channel on the first serving cell; and
a shared channel transmitter configured to transmit the shared channel when the second control channel is transmitted.

5. The eNB of claim 4, wherein
the control channel transmitter is configured, if a cross carrier scheduling is not configured for a serving cell on which the shared channel is transmitted, to transmit the first control channel and the second control channel on the serving cell.

6. The eNB of claim 4, wherein
the first control channel further indicates the number of remaining consecutive subframes in a burst in which the subframe is included.

7. A method in a user equipment (UE), comprising:
receiving a radio resource control (RRC) message to specify subframes for a channel state information-reference signal (CSI-RS);
receiving a RRC message to configure a first serving cell as a scheduling cell for a second serving cell, the second serving cell is a serving cell on which a shared channel is received;
monitoring a first control channel and a second control channel in a subframe, the first control channel indicating whether the CSI-RS in the subframe is available for CSI measurement, the second control channel being a control channel of which detection indicates a transmission of the shared channel in the subframe;

monitoring, based upon a configuration of the first serving cell, the first control channel on the second serving cell and to monitor the second control channel on the first serving cell; and receiving the shared channel when the second control channel is detected.

8. A method in an evolved node B (eNB), comprising:

transmitting a radio resource control (RRC) message to specify subframes for a channel state information-reference signal (CSI-RS);

transmitting a RRC message to specify a first serving cell as a scheduling cell for a second serving cell, the second serving cell is a serving cell on which a shared channel is transmitted transmitting a first control channel and a second control channel in a subframe, the first control channel indicating whether the CSI-RS in the subframe is available for CSI measurement, the second control channel being a control channel of which detection indicates a transmission of the shared channel in the subframe;

transmitting, based upon a configuration of the first serving cell, the first control channel on the second serving cell and to transmit the second control channel on the first serving cell; and transmitting the shared channel when the second control channel is transmitted.

\* \* \* \* \*